US010053904B2

(12) United States Patent
McNeill et al.

(10) Patent No.: US 10,053,904 B2
(45) Date of Patent: Aug. 21, 2018

(54) LOADING DOCK AUTHORIZATION-REMOTE CONTROL

(71) Applicant: Rite-Hite Holding Corporation, Milwaukee, WI (US)

(72) Inventors: Matthew C. McNeill, Whitefish Bay, WI (US); Kyle E. Nelson, Cedarburg, WI (US); Richard A. Horton, Oregon City, OR (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 1029 days.

(21) Appl. No.: 13/966,909

(22) Filed: Aug. 14, 2013

(65) Prior Publication Data

US 2014/0075842 A1 Mar. 20, 2014

Related U.S. Application Data

(63) Continuation of application No. 13/939,862, filed on Jul. 11, 2013, which is a continuation of application
(Continued)

(51) Int. Cl.
*E05F 15/77* (2015.01)
*B65G 69/00* (2006.01)
(Continued)

(52) U.S. Cl.
CPC ................ *E05F 15/77* (2015.01); *B60S 9/02* (2013.01); *B65G 69/005* (2013.01);
(Continued)

(58) Field of Classification Search
CPC .... E05F 15/2076; E05F 15/77; B65G 69/005; B65G 69/2882; G06Q 10/063114; B60S 9/02
(Continued)

(56) References Cited

U.S. PATENT DOCUMENTS 3,961,323 A 6/1976 Hartkorn
3,969,584 A 7/1976 Miller et al.
(Continued)

FOREIGN PATENT DOCUMENTS

DE 10219852 B4 9/2006
EP 1467322 A2 10/2004
(Continued)

OTHER PUBLICATIONS

The Extra Mile, Aug. 2001.

*Primary Examiner* — Yong Hang Jiang
(74) *Attorney, Agent, or Firm* — Ziolkowski Patent Solutions Group, SC

(57) ABSTRACT

A system and method for remotely controlling loading dock components is disclosed that includes a distribution center having at least one dock station for exchanging materials and a dock component configured to in at least two operational states. An actuator is included that is configured to change the operational state of the dock component in response to an activation signal. A mobile remote control is configured to generate the activation signal to cause the actuator to change the operational state of the dock component and at least one predefined non-activation zone is included such that changing of operational state of the dock component is inhibited when the mobile remote control is located within the at least one predefined non-activation zone.

21 Claims, 12 Drawing Sheets

Related U.S. Application Data

No. 10/905,633, filed on Jan. 13, 2005, now Pat. No. 8,497,761.

(51) Int. Cl.

| | |
|---|---|
| *B65G 69/28* | (2006.01) |
| *B60S 9/02* | (2006.01) |
| *G06Q 10/06* | (2012.01) |
| *G05B 15/02* | (2006.01) |

(52) U.S. Cl.
CPC ......... *B65G 69/2882* (2013.01); *G05B 15/02* (2013.01); *G06Q 10/063114* (2013.01)

(58) Field of Classification Search
USPC .... 340/5.1, 5.2, 5.51, 5.52, 5.53, 5.54, 5.55, 340/5.7
See application file for complete search history.

(56) References Cited

U.S. PATENT DOCUMENTS

| | | | |
|---|---|---|---|
| 4,010,571 A | 3/1977 | McGuire et al. | |
| 4,062,157 A | 12/1977 | Potthoff | |
| 4,122,629 A | 10/1978 | Rennick | |
| 4,688,244 A | 8/1987 | Hannon et al. | |
| 4,750,197 A | 6/1988 | Denekamp et al. | |
| 4,849,735 A | 7/1989 | Kirtley et al. | |
| 5,047,748 A | 9/1991 | Trickle | |
| 5,168,267 A | 10/1992 | Trickle | |
| 5,359,942 A | 11/1994 | Ward | |
| 5,453,735 A | 9/1995 | Hahn | |
| 5,459,963 A | 10/1995 | Alexander | |
| 5,640,139 A | 6/1997 | Egeberg | |
| 5,682,379 A | 10/1997 | Mahany et al. | |
| 5,755,126 A | 5/1998 | Lanigan et al. | |
| 5,789,887 A | 8/1998 | Elischewski | |
| 5,831,540 A | 11/1998 | Sullivan et al. | |
| 6,031,465 A * | 2/2000 | Burgess ....................... | 340/5.54 |
| 6,049,448 A | 4/2000 | Lanigan et al. | |
| 6,065,172 A | 5/2000 | Swessel | |
| 6,082,433 A | 7/2000 | Vafaie et al. | |
| 6,181,095 B1 | 1/2001 | Telmet | |
| 6,236,911 B1 | 5/2001 | Kruger | |
| 6,240,335 B1 | 5/2001 | Wehrung et al. | |
| 6,276,744 B1 | 8/2001 | Huber et al. | |
| 6,312,214 B1 | 11/2001 | Nowak et al. | |
| 6,317,025 B1 | 11/2001 | Leon et al. | |
| 6,326,751 B1 | 12/2001 | Mullet et al. | |
| 6,326,754 B1 | 12/2001 | Mullet et al. | |
| 6,329,931 B1 | 12/2001 | Gunton | |
| 6,344,642 B1 | 2/2002 | Agam et al. | |
| 6,385,537 B2 | 5/2002 | Gaspard, II | |
| 6,437,702 B1 | 8/2002 | Ragland et al. | |
| 6,468,021 B1 | 10/2002 | Bonora et al. | |
| 6,481,558 B1 | 11/2002 | Bonora et al. | |
| 6,490,443 B1 | 12/2002 | Freeny, Jr. | |
| 6,493,688 B1 * | 12/2002 | Das ................... | H04N 5/44543 348/E5.105 |
| 6,542,076 B1 | 4/2003 | Joao | |
| 6,542,077 B2 | 4/2003 | Joao | |
| 6,549,130 B1 | 4/2003 | Joao | |
| 6,563,430 B1 * | 5/2003 | Kemink et al. ................. | 340/8.1 |
| 6,611,755 B1 | 8/2003 | Coffee et al. | |
| 6,634,408 B2 | 10/2003 | Mays | |
| 6,661,350 B1 * | 12/2003 | Rohrberg et al. .......... | 340/12.28 |
| 6,665,004 B1 | 12/2003 | Paff | |
| 6,678,999 B2 | 1/2004 | Zengguang et al. | |
| 6,687,609 B2 | 2/2004 | Hsiao et al. | |
| 6,779,581 B2 | 8/2004 | Towley | |
| 6,975,226 B2 * | 12/2005 | Reynard et al. .............. | 340/540 |
| 7,119,673 B2 | 10/2006 | Eager et al. | |
| 7,139,562 B2 * | 11/2006 | Matsui .......................... | 455/420 |
| 7,506,363 B2 * | 3/2009 | Tan et al. ........................... | 726/4 |
| 2002/0089423 A1 | 7/2002 | Przygoda, Jr. | |
| 2002/0164158 A1 | 11/2002 | Hoermann | |
| 2002/0178385 A1 | 11/2002 | Dent et al. | |
| 2002/0183008 A1 | 12/2002 | Menard et al. | |
| 2003/0024998 A1 | 2/2003 | Pierce | |
| 2003/0043021 A1 | 3/2003 | Chung | |
| 2003/0160681 A1 | 8/2003 | Menard et al. | |
| 2003/0167238 A1 | 9/2003 | Zeif | |
| 2003/0199996 A1 | 10/2003 | Reynard et al. | |
| 2004/0056089 A1 | 3/2004 | Larson et al. | |
| 2004/0068424 A1 * | 4/2004 | Lee ................. | G06Q 10/063114 705/7.15 |
| 2004/0201277 A1 | 10/2004 | Hentsch et al. | |
| 2005/0024183 A1 | 2/2005 | Carter et al. | |
| 2005/0102041 A1 | 5/2005 | Duvernell et al. | |
| 2005/0102042 A1 | 5/2005 | Reynard et al. | |
| 2006/0132284 A1 | 6/2006 | Murphy et al. | |

FOREIGN PATENT DOCUMENTS

| | | |
|---|---|---|
| WO | 2002035036 A1 | 5/2002 |
| WO | 2004068772 A2 | 8/2004 |
| WO | 2007024772 A2 | 3/2007 |

\* cited by examiner

LOADING DOCK AUTHORIZATION-REMOTE CONTROL

CROSS-REFERENCE TO RELATED APPLICATION

The present application is a continuation of, and claims priority to, U.S. patent application Ser. No. 13/939,862, filed Jul. 11, 2013, which is a continuation of and claims priority to U.S. patent application Ser. No. 10/905,633, filed Jan. 13, 2005, now issued as U.S. Pat. No. 8,497,761, the disclosures of which are incorporated herein by reference.

BACKGROUND OF THE INVENTION

The present invention relates generally to distribution centers and, more particularly, to a system and method for remotely controlling docking station doors of such facilities. A mobile remote control is configured to generate an activation signal that causes an actuator to enable actuation of the docking station doors and other associated docking equipment only when the mobile remote control is located within a predetermined activation zone.

Numerous facets of commercial enterprises utilize distribution, processing, and manufacturing centers for a variety of purposes. For example, distribution centers are often used to receive, process, and re-ship packages and parcels. On the other hand, manufacturing environments require the delivery of consumable materials and the shipment of finished products and, as such, often include distribution centers in close proximity to manufacturing facilities.

Regardless of the application, these distribution centers typically include at least one docking station configured to receive a trailer for delivery and shipment. Another commonality of these distribution centers is that each docking station generally includes various components to permit and restrict access to and from the distribution via the docking station. For example, the doors are designed to lower the probability of unauthorized entry to the distribution center via the docking station as well as the potential for accidents resulting from an open docking station.

To this end, docking station component manufacturers have developed docking station protocols that dictate that the components of a given docking station remain in a given state until a trailer has been positioned at the docking station and verified as present and ready to be serviced. However, while docking station component manufacturers encourage distribution centers to strictly implement such protocols, manufactures have little control over the actual use of the docking station components following installation. Furthermore, although a distribution center may mandate the suggested protocol for operation of the docking station components, in practice, operators may fail to follow protocol.

Additionally, there is an ever increasing pressure to increase the efficiency of distribution, processing, and manufacturing centers. In order to expedite the receipt and departure of goods from a distribution, processing, or manufacturing center, docking station operators may inadvertently fail to follow operational protocol or may be inclined to "shortcut" aspects of operational protocol. For example, during peak operation of a docking station, the departure of one trailer may be immediately followed by the arrival of another trailer. As such, an operator may be inclined to allow the docking station doors to remain in an open position while the first trailer leaves the docking station and the second trailer arrives at the docking station. As such, the potential for an incident is increased because of a deviation from operational protocol, which may desirably mandate that the doors be closed before a trailer departs from a docking station and remain closed until a subsequent trailer is positioned at and/or secured with the docking station and verified as such.

It would therefore be desirable to have a system and method for controlling the operation of docking station components so as to promote adherence to operational protocol and lower the potential for incidents. Furthermore, it would be advantageous that such a system and method increase the operational efficiency of the docking station.

BRIEF DESCRIPTION OF THE INVENTION

The present invention is directed to a system and method for controlling docking station doors that overcomes the aforementioned drawbacks. Specifically, a mobile remote control is configured to be associated with a docking station operator. The mobile remote control is configured to generate an activation signal that causes an actuator to actuate the docking station doors only when the mobile remote control is located within a pre-designated activation zone.

In accordance with one aspect of the invention, a loading dock remote control system is disclosed that includes a facility having at least one dock station for exchanging materials and a dock component configured to operate in at least two operational states. An actuator is included in the loading dock remote control system that is configured to change the operational state of the dock component in response to an activation signal and a mobile remote control is configured to generate the activation signal to cause the actuator to change the operational state of the dock component. The loading dock remote control system also includes at least one predefined non-activation zone wherein changing operational states of the dock component is inhibited when the mobile remote control is located within the at least one predefined non-activation zone.

In accordance with another aspect of the invention, a method of remotely controlling loading dock doors is disclosed that includes receiving a trailer at a docking station having a remotely controllable dock component and enabling remote activation of the remotely controllable dock component. The method also includes disabling remote activation of the remotely controllable dock component if an operator is located other than in a pre-designated activation zone.

In accordance with yet another aspect of the invention, a loading dock component remote control system is disclosed that includes a facility having a plurality of trailer positions, each trailer position having a dock thereat and a dock component positioned at each dock and configured to be activated permit and restrict access to and from the distribution center from the dock. The loading dock component remote control system also includes an actuator configured to actuate the dock component and a receiver configured to cause the actuator to actuate the dock component in response to an activation signal. Also, the loading dock component remote control system includes a mobile remote control configured to generate the activation signal and having an operable range about the receiver and at least one predefined non-activation zone within the operable range, wherein actuation of the dock component is disabled if the mobile remote control is located within the at least one non-activation zone.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

In one embodiment, the present invention provides a system and method to remotely control the operation of docking station doors. A mobile remote control is configured to be associated with a docking station operator. The mobile remote control is configured to generate a signal configured to allow actuation and control of various docking station components only when the mobile remote control is located within a predefined activation zone. Should the mobile remote control be located in a predefined non-activation zone, the docking station components may be inhibited from operation. The hardware and software that provides for this functionality may also advantageously be used in conjunction with establishing and requiring adherence to an operational protocol intended to improve safety and efficiency of docking station operation.

Figure 1:
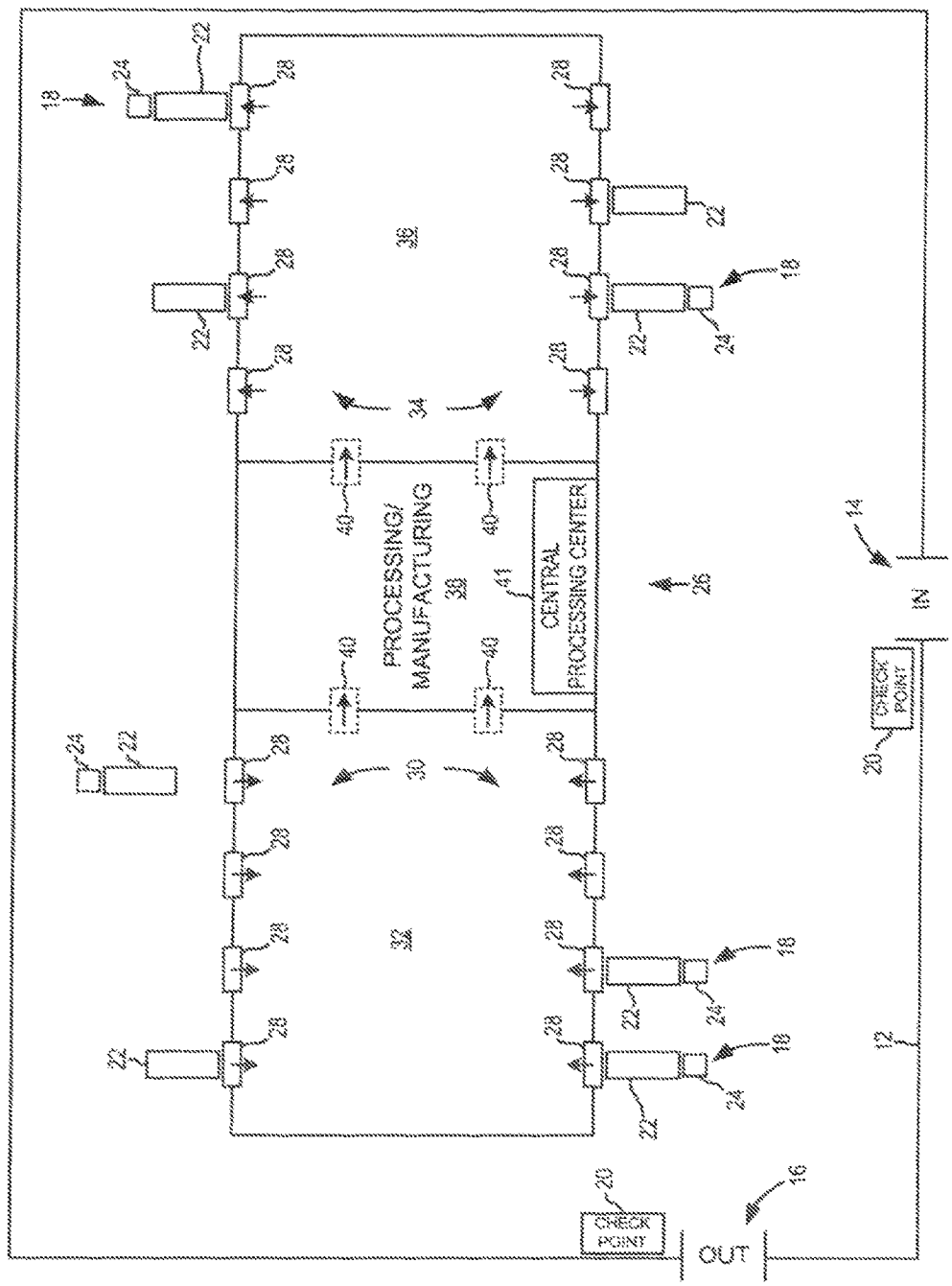
FIG. 1 is a plan view of an exemplary distribution/processing/manufacturing center incorporating the present invention.

An exemplary distribution/processing/manufacturing center 10 is shown in FIG. 1. That is, the exemplary center 10 may, for example, be configured as a distribution center, a processing center, a manufacturing center, or any other center that includes docking stations. Optionally, the distribution center 10 can include an enclosure 12 extending thereabout to enclose the distribution center 10 and provide security. The enclosure 12 can include an entrance gate 14 and an exit gate 16. Alternatively, it is understood that the optional enclosure 12 could be provided with a single gate constructed to allow bi-directional passage of a plurality of tractor/trailers 18 therethrough for admittance and departure from the distribution center 10. A terminal checkpoint 20 may also be provided at the entrance gate 14 and the exit gate 16 and may be attended by facility personnel to verify arrival or departure of tractor/trailers 18.

Each tractor/trailer combination 18 includes a trailer 22 that is separable from a tractor 24 connected thereto. These vehicles are commonly referred to as semi-trucks and semi-trailers, respectively, and will be discussed further below with respect to FIG. 2. However, it us understood that a tractor/trailer combination, as used herein, can include an integral unit, such as that known generally as straight trucks. That is, the present invention is not limited to use by only tractor/trailers, but may be used in any distribution-type center with any type of movable carrier including straight-trucks, vans, and the like.

A facility 26, for example a facility that performs shipping/receiving, includes a plurality of docking stations 28 wherein each docking station 28 is constructed to allow loading and unloading of materials thereat. The exemplary facility 26 includes a first group 30 of docking stations 28 positioned proximate to a consumable staging area 32 to receive and store materials delivered to the facility 26 to be consumed, or used, in manufacturing or processing procedure and a second group 34 of docking stations 28 that is positioned proximate to a product staging area 36 and are constructed to allow the loading of product into trailers 22. A processing area 38 is positioned between the consumable staging area 32 and the product staging area 36 and has a plurality of passageways 40 extending therebetween. As will be described, the facility 26 may include a central processing center 41 to coordinate operations at the docking stations 28. The central processing center 41 is illustrated as being integrated within the facility 26, however, it is contemplated that the central processing center 41 will not be limited by location and may be located virtually anywhere. The central processing center 41 may be operated by a manager or coordinator who reviews feedback from components and/or operators located at the docking stations 28. The operator, with the aid of the central processing center 41, may process the feedback and directs/coordinates operations within the facility 26 to ensure efficient operations and that proper workflow protocol is followed. Additionally or alternatively, the central processing center 41 may include automated processing systems configured to receive the feedback and automatically respond thereto. Furthermore, as will be described, the central processing center 41, whether through automated processing systems or operator direction, may be utilized to generate/compile reports, alerts, and notices regarding operations within the facility 26.

Although exemplary, it should be understood that such a layout achieves efficient and separable material flow between consumable delivery and processed product. It is additionally understood that, although the facility 26 has a plurality of docking stations 28, space and financial limitations may limit the number and type of docking stations a facility may have. A facility having only one docking station can achieve benefits from the present invention.

Figure 2:
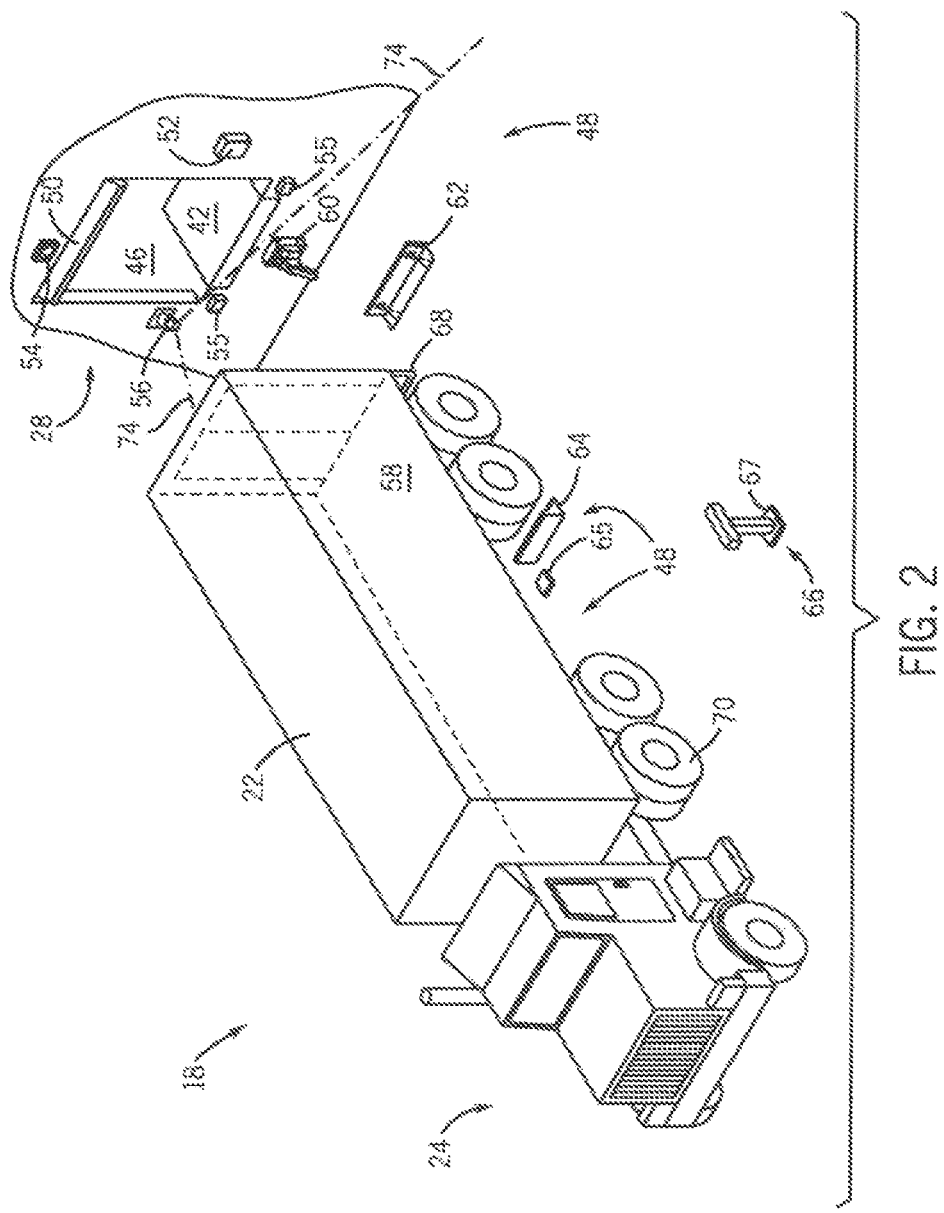
FIG. 2 is a perspective view of a tractor/trailer and an associated docking station of the distribution/processing/manufacturing center shown in FIG. 1 having a plurality of dock components.

Referring to FIG. 2, each docking station 28 is preferably equipped with a plurality of components that can include a dock leveler 42, a restraint system 48, a dock door 50, a traffic signal 52, a loud speaker 54, trailer presence sensors 55, a camera 56, and the like. However, based on specific needs, one skilled in the art will understand not all need be so equipped, but would still be encompassed in such a system. For example, some docking stations 28 may include extendable belt or roller loader conveyers.

As will be described in detail with respect to FIGS. 3-6, some or all of the components, for example, the dock door 50 is configured to be remotely actuated. As used herein, "dock door" is used to refer to a door or other barriers or restraints to entrance or egress to and from a docking station. For example, "dock door" may include restraints or barriers such as a Safe-T-Gate™ safety barrier or Dok-Guardian™ safety barrier. Safe-T-Gate™ and Dok-Guardian™ are trademarks owned by Rite-Hite® Corporation of Milwaukee, Wis. Rite-Hite® is a registered trademark of Rite-Hite® Corporation of Milwaukee, Wis. Furthermore, the components of the docking station 28 may include non-electrically powered components and/or may include electrically powered components that are adapted to be activated or engaged remotely. The dock leveler 42 is constructed to operatively engage a bed 58 of trailer 22 and allow the passage of lift trucks, personnel, or the like into and out of the trailer 22. The restraint system 48 is constructed to engage and secure trailer 22 to facility 26 proximate to docking station 28.

The restraint system 48 may include multiple means of restraint. As shown, the restraint system 48 can include an ICC bar or Rear Impact Guard (RIG) dependent restraint 60, a wheel lock 62, a wheel chock system 64, and a trailer stand system 66. It is recognized that any particular system may include any one or all of the specific components of the restraint system 48 or other similar systems of restraining the trailer 22. When the trailer 22 is present at the docking station 28, the ICC bar restraint 60 engages an ICC bar 68 of the trailer 22 to secure the trailer 22 against unauthorized removal from the docking station 28. Additionally, or alternatively, the wheel lock engages a wheel 70 of the trailer 22 so as to preclude movement of the trailer away from the docking station 28. A wheel chock 64 could be used to secure the wheel 70 of the trailer 22 against movement in a manner similar to the wheel lock 62. In one embodiment, the chock 64 incorporates a sensor 65 configured to detect proper engagement with the wheel 70 of the trailer to provide feedback regarding proper engagement. Additionally, if the trailer 22 is removed from the tractor 24, a trailer stand 66 may be used that includes a trailer stand sensor 67. The trailer stand sensor 67 is configured to sense whether the trailer stand is properly engaged and supporting the trailer 22 and, as will be described, is configured to send feedback regarding such. It is understood that the trailer restraint system 48 may include any or all of the aforementioned devices. Additionally, the trailer restraint system 48 may include other trailer restraining or warning systems.

As will be described in detail below, the signal lights 52, the speaker 54, and the camera 56 together with the remaining components and mobile remote control system are configured to facilitate an approved workflow procedure so as to enforce workflow protocol. Specifically, the camera 56 is configured and positioned with sightlines 74 so as to acquire images, both video and still, that can be reviewed to verify proper trailer engagement and restraint by the restraint system 48. The specific positioning shown is merely exemplary. Additionally, the speaker 54 and signal lights 52 are configured to convey information to operators exterior to the docking station 28. For example, the speaker 54 may communicate audible alerts or reports regarding workflow procedures and whether approved workflow protocol is being properly followed. Additionally, the signal light 52 may be configured to be remotely controlled to communicate proper engagement/disengagement of the restraint system 48 to individuals exterior to the docking station 28.

Figure 3:
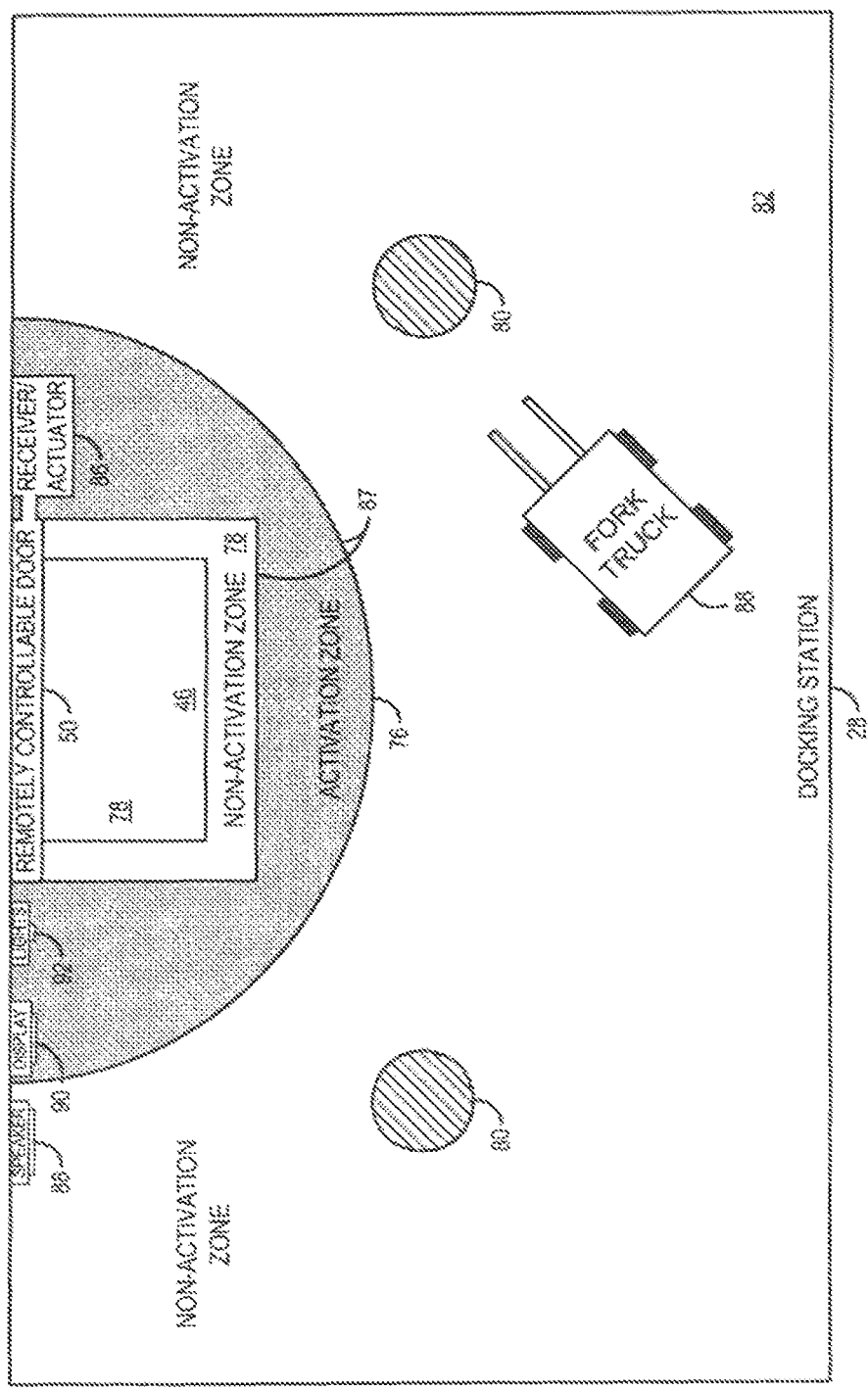
FIG. 3 is a plan view of a docking station having remotely controllable components in accordance with one embodiment of the present invention.
Figure 4:
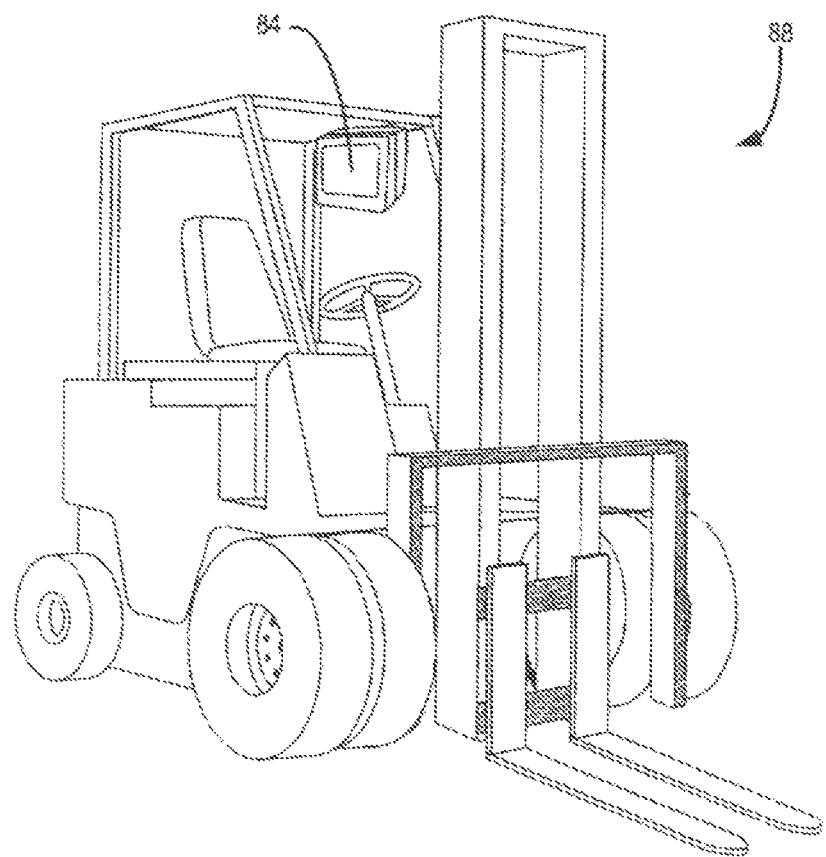
FIG. 4 is a fork truck including an interactive display in accordance with one embodiment of the present invention and configured for use with the remotely controllable components of FIG. 3.

Referring now to FIGS. 3 and 4, a system for remote actuation of a docking station component is shown. For exemplary purposes, FIGS. 3 and 4 will be described with respect to remote actuation of the dock door 50 of FIG. 2. However, such description is for exemplary purposes only and it is contemplated that any docking station component may be controlled in a similar manner. Therefore, while FIGS. 3 and 4 describe a system for controlling the dock door, it is equally contemplated that the described system may be utilized to control any component of the docking station or facility housing the docking station to enhance productivity and efficiency while reducing the potential for undesired incidents.

Within the docking station 28 are a plurality of zones including at least one "activation zone" 76, one "non-activation zone" 78, and a plurality of optional "hot spots" 80 strategically positioned throughout the remaining area of the docking station 28, which also preferably functions as an activation zone. That is, the "hot spots" 80 operate as activation zones disposed within the remainder of the docking station, which operates as a non-activation zone 82. The zones define areas such that allow and restrain operation and/or control of a desired component of the docking station 28. Again, for exemplary purposes, operation and control of a dock door will be described. As such, the zones 76-82 will be described as defining areas that serve to allow and restrain remote opening and closing of a given dock door by a mobile remote control 84.

When the mobile remote control 84 is located within the activation zones 76, 80, the dock door 50 functions as a remotely controllable door and may be remotely actuated by transmitting an activation signal from the mobile remote control to an actuator/receiver 86 configured to open the dock door 50. On the other hand, should the mobile remote control be moved from a designated activation zone 76, 80 to a non-activation zone, 78, 82, the dock door 50 is inhibited from operation.

It is contemplated that dock door actuation may be enabled or inhibited based on the location of the mobile remote control 84. Additionally, it is contemplated that dock door actuation may be enabled or inhibited based on the location of the operator assigned to operate the docking station 28. That is, it is contemplated that operators may be required to carry electronic identification at all times while operating the docking station 28. Accordingly, the electronic identification may be tracked to determine operator location with respect to the activation zones 76, 80 and non-activation zones 78, 82. Further, it is contemplated that a combination of both location tracking techniques may be utilized so that both the mobile remote control 84 and the operator assigned to use the mobile remote control 84 must be located in an activation zone 76, 80 in order to actuate the dock door 50.

As will be described, the system may be configured to restrict control of the docking station components, for example the dock door 50, to a particular authorized user, fork truck, or the like. For example, the activation signal may be specific to a particular user identification, a fork truck identification, and/or a floating hybrid of identifiers, such as a class of operators or users. Accordingly, only an authorized activation signal will be accepted and allow remote component control. For example, a particular user or fork truck may be assigned to a particular docking station and be permitted to control components of the particular docking station, for example, the door. Additionally or alternatively, operation of a component may be restricted to a user or fork truck that originally initiated operation of the component. Specifically, for example, when a given user or fork truck opens a particular dock door, only an activation signal from that given user or fork truck may be accepted to close the particular dock door.

Additionally, it is contemplated that the dock door 50 may be inhibited or precluded from opening in a number of manners. Specifically, the mobile remote control 84 may be configured to identify whether its present location is outside one of the activation zones 78, 82 and, if so, operate to not generate an activation signal to actuate the dock door 50. In this case, once the mobile remote control 84 is returned to an activation zone 76, 80, the mobile remote control 84 will then generate an activation signal upon such prompting. Alternatively, the mobile remote control 84 may be configured to generate an activation signal regardless of locality. In this case, when the activation signal is received a determination is made to check the current location of the mobile remote control 84. If the mobile remote control is located in an activation zone 76, 80, the dock door adheres to the activation signal and activates. However, if the mobile remote control 84 is outside an activation zone 76, 80, the activation signal is ignored and the door is precluded/inhibited from opening until an activation signal that is subsequently determined to have been generated from within an activation zone 76, 80 is received.

It is contemplated that the activation zones 76, 80 and the non-activation zones 78, 82 be strategically designated to facilitate mandating approved workflow procedures for optimal safety and efficiency. For example, it is contemplated that a non-activation zone 78 be designated so as to preclude actuation of the dock door 50 when the mobile remote control 84 is located in proximity to the dock leveler 46. In this regard, an operator is precluded from being positioned too closely to the either the leveler 46 or the dock door 50 during actuation of the dock door 50. It is also contemplated that while the operator is precluded from actuation while in close proximity to the dock leveler 46 and dock door 50, the operator is also precluded from actuating the dock door 50 when the mobile remote control 84 is located too far from the dock door 50. Specifically, although it is contemplated that the activation signal generated by the mobile remote control 84 may be of sufficient strength to reach the actuator/receiver 86, actuation of the dock door 50 is precluded when in a non-activation zone 82 spanning the remainder of the docking station 28. Accordingly, the operator is precluded from actuating the dock door 50 when at a distance too great for visual verification, as required under approved workflow protocol. By requiring the operator to be within a given proximity of the dock door 50 before actuation, the operator can visually verify safety conditions surrounding the dock door 50 prior to actuation.

As will be further described, the system can be advantageously used in a variety of ways to allow/prevent a user, fork truck, and/or class of users, from performing a loading or unloading operation until the steps of the protocol have been satisfied. It is contemplated that the system can be utilized with both electrically powered components and/or non-electrically powered components. For example, some components may be activated and/or actuated by electrical power. Furthermore, some components may include sensors configured to operate with a powered interlock but be manually actuated once the power interlock is disengaged. It is contemplated that any given facility may include virtually any combination of electrically powered components and/or non-electrically powered components. That is, the described systems and techniques may be configured to operate with any combination of electrically powered component as well as non-electrically powered components.

In the case of non-electrically powered components, once the presence of a particular user or fork truck has been identified, the system may be adapted to send feedback to a centralized processing center to alert a supervisor or manager. In response to the feedback, the supervisor or manager may transmit instructions to guide a dock worker through the approved workflow protocol. Such transmission could be a step-by-step transmission of the protocol or a batch transmission of all of the steps. Further, the transmission could be automated, as opposed to supervisor or manager-initiated. As such, should the dock worker stray from the approved workflow protocol or delays in performing the steps of the approved workflow protocol, an alert or warning may sound. As will be described, this alert or warning may be transmitted to the dock worker or back to the supervisor, manager, or central processing center and/or be recorded for later review.

As a further example, in the case of electrically powered components, as previously described, the components may be configured to only respond to signals from a given remote control. Again, the remote control may be carried by the operator, integrated in a fork truck, or located at a designated position in the facility. In any case, the remote control or control box may be configured to operate according to the approved workflow protocol and only respond to authorized users or classes of users.

The activation zones 76, 80 and non-activation zones 78, 82 are defined and controlled by way of a boundary 87 to facilitate monitoring. The boundary can be controlled by an inductor coil boundary monitoring system, an infrared (IR) sensor boundary monitoring system, a laser boundary monitoring system, a radar boundary monitoring system, or any other type of boundary-monitoring system. As an example, during construction of the docking station 28, an inductor coil may be disposed within the floor of the docking station 28 so as to form a perimeter that, when energized, is electrically detectable. Accordingly, the mobile remote control 84 can determine position by tracking locality with respect to the induction coil. Alternatively, or to facilitate retrofitting of the present invention to existing docking stations 28, an infrared sensor monitored boundary, a laser monitored boundary, a radio frequency (RF) sensor monitored boundary, a global positioning system (GPS) monitored boundary, or a radar monitored boundary may be utilized to provide sufficient zone and boundary definition.

As shown in FIG. 4, the mobile remote control 84 may be configured to be mounted to or in a vehicle intended to facilitate exchanging materials. For example, a fork truck or forklift 88 or other similar vehicle that is designed to facilitate loading and unloading of trailers or to convey personnel through the facility. Alternatively, it may be a personal wearable device (PWD) that is specific to each worker, versus specific to a device. In the embodiment shown in FIG. 4, the mobile remote control 84 is mounted to the fork truck 88 in a manner so as to be readily available to the operator, but not interfere with operation or visibility while operating the fork truck. As illustrated in FIG. 4, the mobile remote control 84 may be a small computer that includes a touch screen configured to display information regarding workflow protocol and receive feedback from the operator. As previously suggested, the mobile remote control 84 may be an autonomous unit so as to be portably carried by an individual operator. For example, it is contemplated that the mobile remote control may be similar to a personal digital assistant (PDA), PWD, or laptop computer system.

In any case, as will be described with respect to FIGS. 5 and 6, the mobile remote control 84 may be configured to actuate the dock door 50 remotely, but also provide additional functionality such as to provide a broad spectrum of information to the operator. However, referring to FIG. 3, should the mobile remote control 84 be streamlined such that only actuation of the dock door 50 door is supported, it is contemplated that additional lights 88, a display 90, and a speaker 92 may be included to communicate information to operators of the docking station 28.

Figure 5:
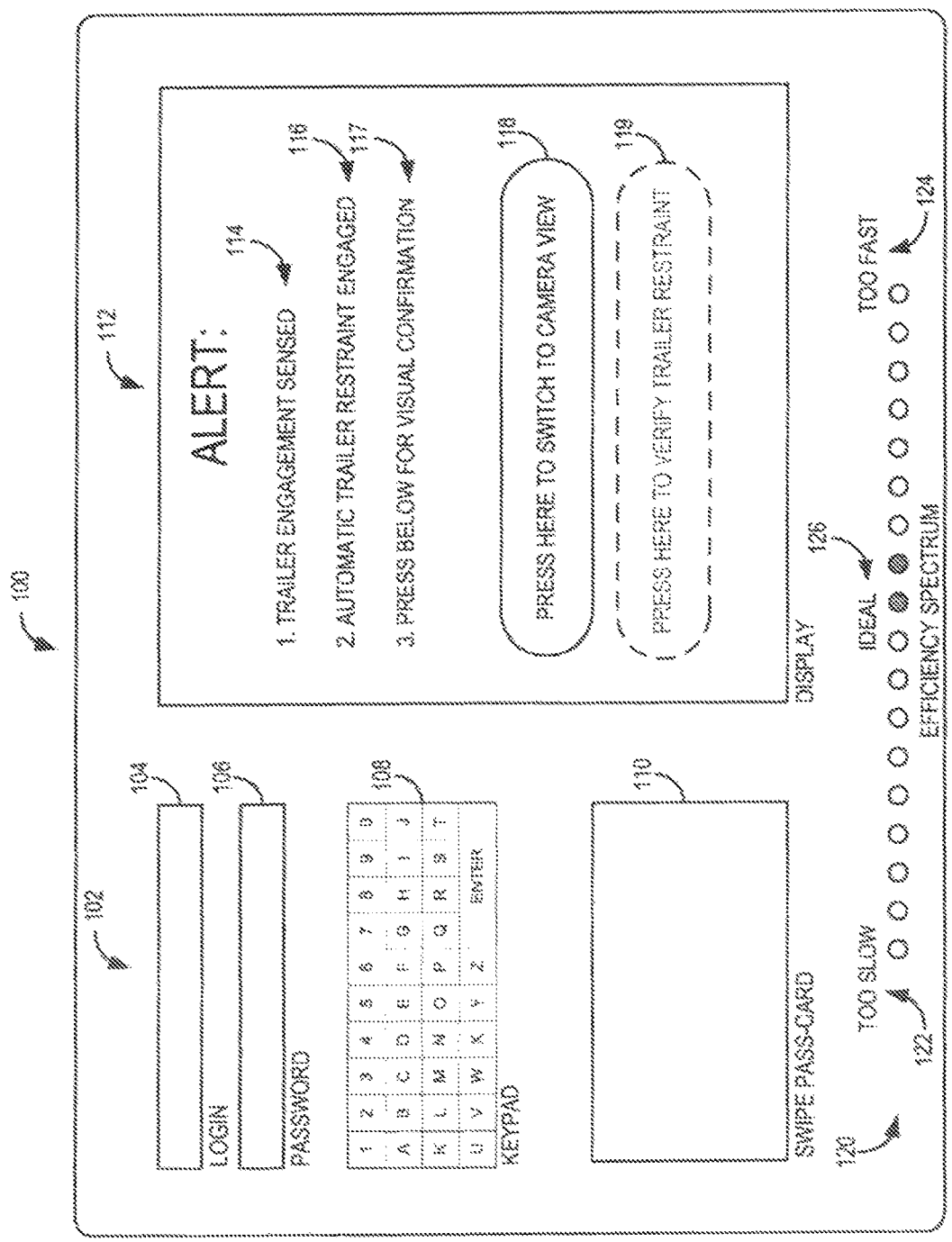
FIG. 5 is a graphical user interface configured for operator control of the docking station of FIG. 2.

Referring now to FIG. 5, a graphical user interface (GUI) 100 is shown. The GUI 100 is designed to be displayed on the mobile remote control 84 of FIG. 4. The GUI 100 includes a plurality of sections designed to receive and communicate a variety of information to and from an operator. Specifically, the GUI 100 includes a login section 102 configured to receive identifying information from an operator. As shown, the login section 102 includes a login entry dialog box 104, a password entry dialog box 106, and a keypad 108 for entering a username and password. Additionally or alternatively, a "swipe" or pass-card pad 110 can be included whereby the operator can use an electronic identification card (not shown) to "login" by passing the electronic identification card in close proximity to the reader 110. The mobile remote control 84 electronically detects the unique electronic identifier of the electronic identification card and logs the operator into the mobile remote control.

In accordance with one embodiment of the invention, entry of a login and password or electronic identification of the operator via electronic identification card or swipe card is required to use the mobile remote control. By requiring a login and password the mobile remote control can tailor the activation signal generated to actuate the dock door remotely to the specific operator. Additionally, once an operator is logged in, the component monitoring system, as will be described, can track that operator and configure that mobile remote control to operate only one particular dock door designated to that operator. As such, the system can be configured such that only one mobile remote control is enabled to actuate a given dock door and further require the operator to logout before another operator can actuate a given dock door.

The GUI 100 also includes a display section 112 configured to display alerts, reports, and other information to the operator. As shown, the display section 112 can convey information to the operator regarding workflow and the present position of the operator to ensure approved workflow protocol. For example, the display section 112 may inform the operator that trailer presence has been sensed at the assigned docking station 114, the trailer restraint has engaged the trailer 116, and prompt the operator to activate the camera 117 disposed at the docking station to visually confirm proper engagement of the trailer restraint. Additionally, should the truck/trailer include an air ride suspension, it is contemplated that the operator may receive a notification that it has been dumped before trailer restraint is initiated by the system or an operator. Accordingly, the notification that a trailer is present and dumping has been completed will serve to indicate to the operator to initiate trailer restraint. Further still, should the truck/trailer include adjustable tandems/bogies, the operator may receive an indication that the adjustable tandems/bogies have been positioned at the fully-rearward position.

As shown, the GUI may receive input from the operator that changes the display section 112 to show the images 118, still or video, gathered by the camera 56 of FIG. 2 and then, once the images are displayed the operator may provide feedback by pressing a restraint verification button 119 to indicate that the operator has visually verified proper restraint of the trailer against movement away from the docking station. The operator cannot provide visual verification feedback until the display section 112 is switched to display the camera images of the trailer restraint system. While this feature is illustrated by a dashed restraint verification button 119, the button might be grayed-out, colored, shaded, or flashing until pressed.

It is contemplated that the system may be configured to bypass use of the trailer restraint system if deemed necessary and if within the approved workflow protocol. That is, should a trailer arrive that is incompatible with a particular trailer restraint, for example an ICC bar restraint, the operator may be able to indicate such and allow an alternative restraint mechanism, such as a chock, to be utilized. In such a case, the operator may indicate that a particular restraint could not be properly engaged. The operator may then, if compatible with the approved workflow, override the fault condition or indicate that an alternative restraint was utilized.

Additionally, the GUI 100 includes an efficiency spectrum display 120. As will be described, an efficiency tracking system is included that periodically, or in real-time, reviews feedback indicative of the current efficiency of the operator in completing the designated workflow protocol. The efficiency tracking system then synthesizes this feedback and transmits a status indicator to the mobile remote control to display the efficiency of the operator on the efficiency spectrum 120. In accordance with one embodiment, the efficiency spectrum 120 includes a plurality of indicators that are labeled to range from "too slow" 122 to "too fast" 124. The "too slow" indicator 122 is designed to indicate when the operator is performing within the workflow protocol below a proficient level and the "too fast" indicator 124 is designed to indicate when the operator is performing within the workflow protocol at a level which is outside the prescribed bounds as determined for safety and proficiency. Located between the "too slow" indicator 122 and the "too fast" indicator 124 is an "ideal" indicator 126. Accordingly, the operator is provided with feedback regarding the operator's own efficiency within the workflow protocol.

Additionally, it is contemplated that the operator may be permitted to suspend the workflow under some conditions. For example, should the operator identify a damaged good or pallet, the operator may indicate such through the GUI 100 and suspend timing until the condition is rectified. Accordingly, the frequency and/or duration of suspensions and corresponding causes may be recorded or tracked.

Once the operator has visually confirmed that the trailer is present and the restraint systems 48, of FIG. 2, are properly engaged with the trailer by pressing the restraint verification button 119, the dock doors are enabled. That is, until visual verification is received and stored, a lock-out precludes actuation of the dock door. Once the dock door is opened, or at some other time in the operational protocol, the system may be configured to monitor the frequency and duration between traversals of the fork truck or operator to and from the trailer. Furthermore, should a traversal or attempted traversal be detected prematurely within the approved workflow protocol, an alarm or alert may be indicated. This alarm or alert may be transmitted directly to the operator, to the docking station, and/or to the supervisor in the central processing center. Accordingly, such premature traversals that deviate from the approved workflow protocol may be recorded and reported. Accordingly, operators are restricted from performing loading/unloading until all pre-loading/unloading steps of the approved workflow process are complete. For example, leveler activation and/or the telescoping conveyor extension may be precluded until trailer jack engagement and confirmation is complete.

Figure 6:
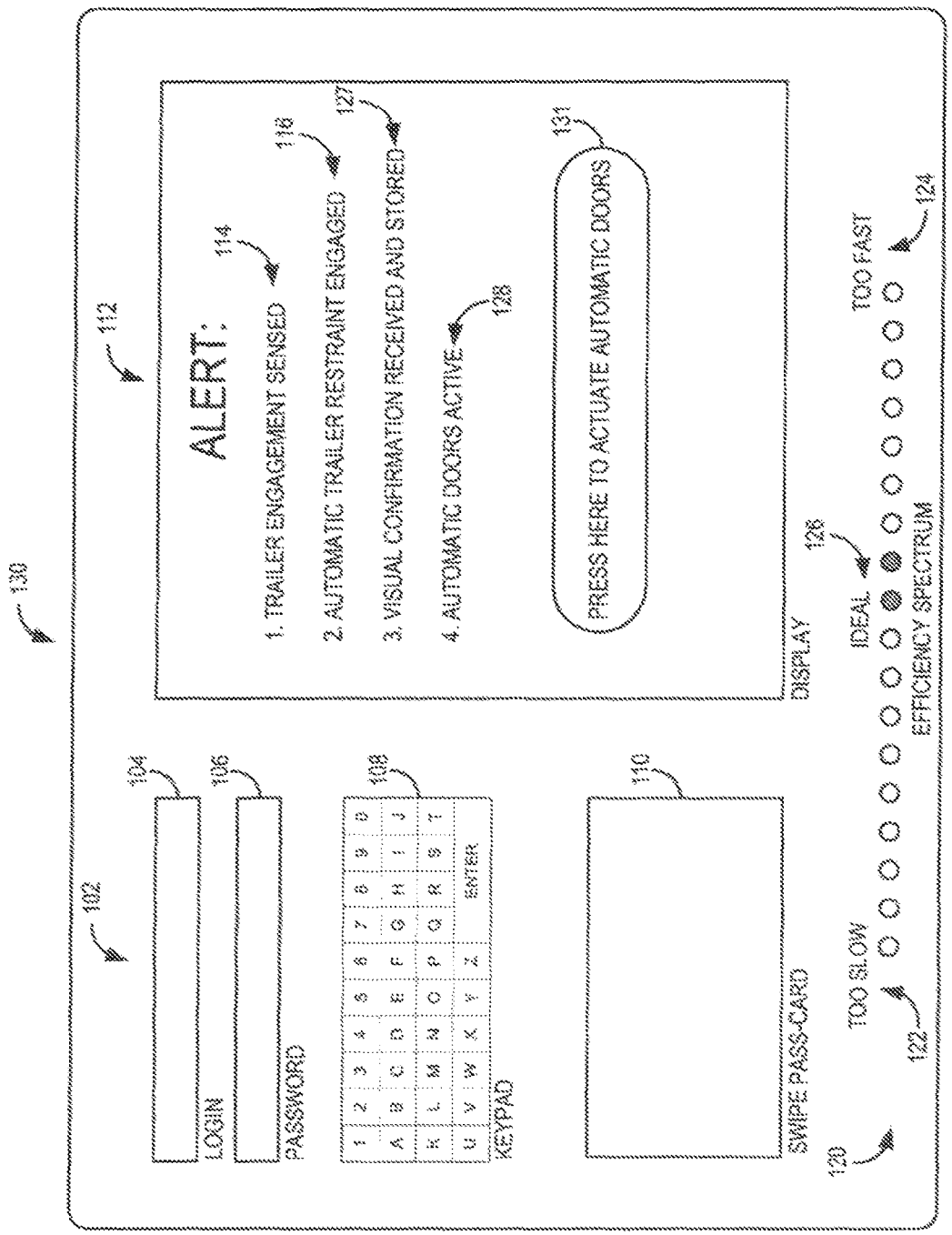
FIG. 6 is another graphical user interface configured for operator control of the docking station of FIG. 2.

Referring to FIG. 6, another mobile remote control GUI 130 is shown following operator confirmation of proper trailer restraint. Once the operator has visually verified that the trailer is properly restrained by the trailer restraint system, the display section 112 switches back from the camera view to alert the operator that the visual confirmation was properly received and stored 127 and the doors are now active 128. Accordingly, the GUI now includes an actuation button 131 configured to cause the mobile remote control to generate an activation signal to actuate the doors upon operator initiation. Again, as previously described with respect to FIG. 3, the mobile remote control must be located in an activation zone 76, 80 for action to be uninhibited. However, as long as the mobile remote control is not located in a non-activation zone 78, 82 the activation signal is allowed to be generated by the mobile remote control, or is not blocked at the door, and the actuator/receiver 86 is allowed to open or close the dock door 50 in response.

While the aforementioned description sets forth real-time efficiency feedback, the system also includes stored and comparative feedback. That is, as will be described with respect to FIG. 12, the system can communicate a wide range of real-time and composite feedback that may be sent to an operator or other users.

Figure 7:
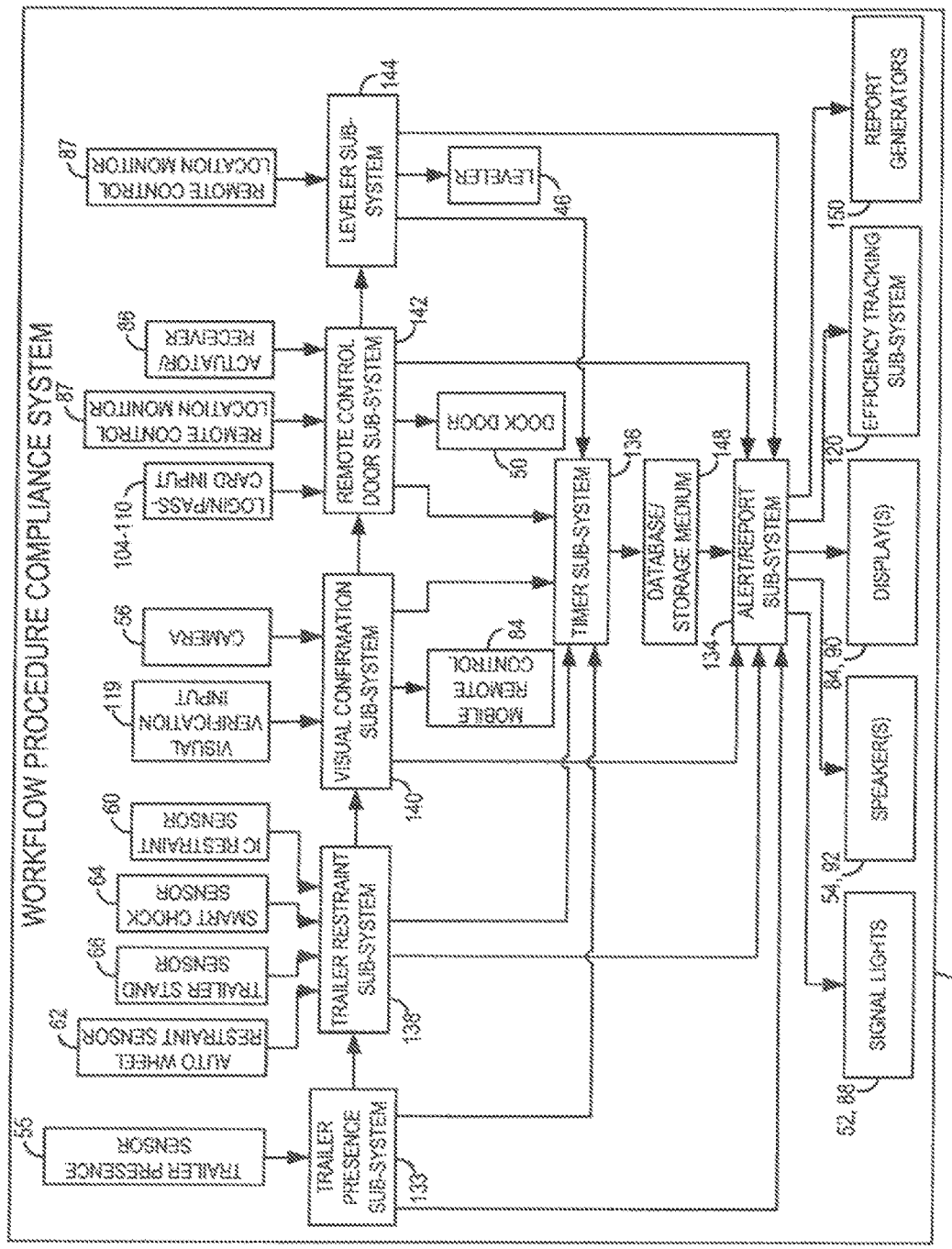
FIG. 7 is a schematic overview of a workflow procedure compliance system for the docking station of FIG. 2.

Referring now to FIG. 7, a schematic overview of a workflow procedure compliance system 132 is shown. The workflow procedure compliance system 132 includes many of the systems previously described with respect to FIGS. 1-6, which operate as sub-systems of the workflow procedure compliance system 132. For example, workflow procedure compliance system 132 includes the trailer presence sensors 55, wheel restraint system 62, trailer stand system 66, smart chock system 64, ICC bar restraint system 60, visual verification input 119, camera 56, login/pass-card input 104-110, remote control location monitor 87, and actuator/receiver 86, as previously described with respect to FIGS. 2 and 5. As indicated by the directional arrows, these systems serve as inputs for the various sub-systems of the workflow procedure compliance system 132.

Specifically, the trailer presence sensors 55 serve as an input to a trailer presence sub-system 133 that is configured to monitor the feedback from the trailer presence sensors 55 to determine when a trailer is present at a particular docking station. Once the presence of the trailer is detected, the trailer presence sub-system 133 sends an alert to an alert/report sub-system 134 and a timer sub-system 136. As will be described, the alert/report sub-system 134 and the timer sub-system 136 are configured to send/record an alert that is communicated to either a docking station operator or docking station manager to indicate that a trailer has arrived at a given docking station and initiate a counter, or record a time stamp, to determine a duration for response to the alert, respectively. The alert/report sub-system 134 may be configured to track and indicate a variety of conditions. For example, dumping of air-ride suspension, positioning of the tandem/bogey, and the like may be tracked/recorded by the alert/report sub-system 134.

Upon completion of the communication of these alerts, the trailer presence sub-system 133 passes control of the workflow procedure compliance system 132 to the trailer restraint sub-system 138. The trailer restraint sub-system 138 receives feedback from the wheel restraint sub-system 62, trailer stand sub-system 66, smart chock sub-system 64, and ICC bar restraint sub-system 60 to determine when the trailer present at a given docking station is properly restrained against removal therefrom in compliance with approved protocol. Upon such determination, the trailer restraint sub-system 138 then sends alerts to the timer sub-system 136 to set another counter, or time stamp, and the alert/report sub-system 134 to send notification of proper restraint and passes control of the workflow procedure compliance system 132 to a visual confirmation system 140.

The visual confirmation sub-system 140 receives feedback from the camera, either as still images or video, and transmits the images to the mobile remote control 84 and/or to a centralized processing center for supervisor or dock manager review and storage. As previously described with respect to FIGS. 5 and 6, the images are displayed on a GUI to facilitate verification of proper trailer restraint which is indicated through visual verification input 119. Similarly to the trailer presence sub-system 133 and the trailer restraint sub-system 138, once the visual confirmation system receives feedback indicating operator verification of trailer restraint from the visual verification input 119, an alert is sent to the timer sub-system 136 and the alert/report sub-system 134 and control of the workflow procedure compliance system 132 passes to a remote control door sub-system 142.

As described with respect to FIGS. 2-7, the remote control door sub-system 142 of FIG. 7 receives feedback from the login/pass-card input 104-110, remote control location monitor 87, and actuator/receiver 86. The feedback is utilized to determine the particular activation signal necessary to actuate the dock doors 50, the location of the mobile remote control and when to activate the actuator/receiver 86. Once remote door actuation of the dock doors 50 is complete, an alert is sent to the timer sub-system 136 and the alert/report sub-system 134 and control of the workflow procedure compliance system 132 passes to a leveler sub-system 144.

The leveler sub-system 144 operates similarly to the remote control door sub-system 142 since it receives feedback from the mobile remote control position monitor 87 and determines whether the mobile remote control is located within a proximity of the dock leveler 46 such that leveling should be enabled. However, once the leveler sub-system 144 determines that the mobile remote control is not located on or is in too close of a proximity to the dock leveler 46, the dock leveler 46 is enabled and remote activation of the dock leveler 46 is permitted.

As stated, the workflow procedure compliance system 132 may advantageously include a timer sub-system configured to receive alerts from each of the other systems 132-144 such that each step of the workflow procedure is timed. All timing information is then stored in a database/storage medium 148 that can be accessed by the alert/report system 134 to provide a wide variety of feedback, alerts, and reports to docking station operators and managers. Specifically, the alert/report sub-system 134 is configured to operate the signal lights 52, 88, provide auditory alerts to the speakers 54, 92, provide information to the efficiency tracking sub-system 120, and provide information to the displays 84, 90, as described with respect to FIGS. 2-4.

The alert/report sub-system 134, FIG. 7, is also configured to generate a wide variety of reports and printouts 150. For example, it is contemplated that the reports may include real-time display of current distribution center, dock, and operator efficiency, periodic efficiency information, and composite distribution center, dock, and operator efficiency information. Further, the reports may include a comparison of a particular user's performance and/or efficiency to another user's performance and/or efficiency. Furthermore, the reports may include a comparison of a particular user's current performance and/or efficiency to that user's previous performance and/or efficiency.

Figure 8:
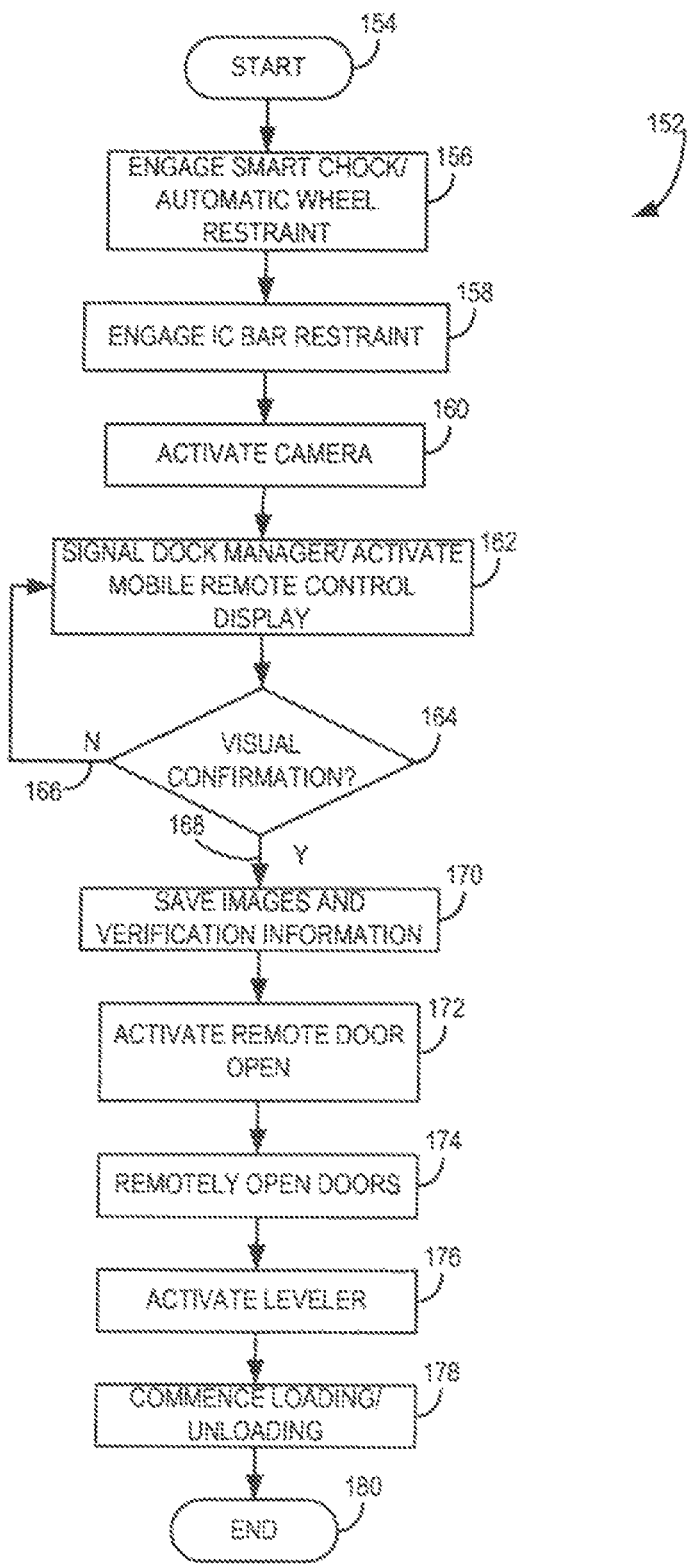
FIG. 8 is a flow chart illustrating the steps for mandating an approved workflow protocol for operation of the docking station of FIG. 2 with the workflow procedure compliance system of FIG. 7.

Referring to FIG. 8, the steps of a technique 152 for mandating workflow protocol is shown. The technique 152 is controlled by the workflow procedure compliance system 132, as described with respect to FIG. 7. The workflow protocol shown, however, is only for exemplary purposes and other workflows are contemplated and fall within the scope of the claimed invention. The steps of the technique 152 are controlled by the workflow procedure system 132 of FIG. 7 so that a first step of the technique 152 must be completed and the system be in a satisfactory operational state in compliance with approved workflow protocol before a second, or subsequent, step may initiate. That is, the workflow procedure system 132 of FIG. 7 controls the specific order of the steps through the docking station components and precludes subsequent steps from initiating until prior steps have reached an operational state compliant with approved workflow protocol.

The technique starts 154 when a trailer is identified as present at a specific docking station. Again, if applicable, the system may initiate, identify, and/or track dumping of an air-ride suspension. Next, one or a combination of restraint components may be utilized to restrain the trailer. For example, shipping yard workers or a trailer operator may engage a smart chock system and/or a smart wheel lock 156. Specifically, as described with respect to FIG. 2, a smart chock system may be engaged whereby a sensor disposed within the shipping yard or within the smart chock detects proper engagement with the trailer wheels and provides remote feedback of such. Additionally or alternatively, a smart wheel lock may be engaged with the trailer wheels to secure the trailer against movement and also provide feedback regarding proper and continual engagement. Furthermore, the trailer may be additionally or alternatively engaged by an ICC bar restraint to secure the trailer against removal from the docking station 158. Similarly, a trailer jack may or may not be engaged. It is noted that, in practice, the facility will typically only utilize one of the wide variety of restraints with or without a trailer jack.

Once all trailer restraints are properly engaged, as indicated by sensor feedback 156-158, a camera is activated 160 that is configured with a viewing range so as to provide images of the trailer restraint systems 156-158. Once the camera is active 160, a signal is either sent to a docking station manager to review the images or to the mobile remote control for docking station operator review 162. In either case, the images are displayed to enable a reviewer to provide visual confirmation of air-ride suspension dumping, rearward positioning of tandems/bogeys, proper jack placement, and/or proper trailer restraint 164. If visual confirmation is not received in a timely manner 166, subsequent signals are sent to the reviewer 162. Once visual confirmation is received 168, the images are saved along with reviewer identification information 170 to create a record of adherence to proper workflow protocol.

Following proper trailer restraint and confirmation thereof 156-170, the remotely controllable docking station door is enabled 172. This allows the remotely controllable docking station door to be remotely actuated via the mobile remote control 174. Following actuation of the remotely controllable docking station door 174, the docking station leveler and/or conveyer system is activated 176 and loading or unloading may commence 178, thereby ending this portion of the workflow protocol 180. That is, as previously described, it is contemplated that the workflow protocol and tracking thereof may continue by tracking the loading/unloading and undocking process. For example, operator traversals to and from the trailer may be monitored.

Figure 9:
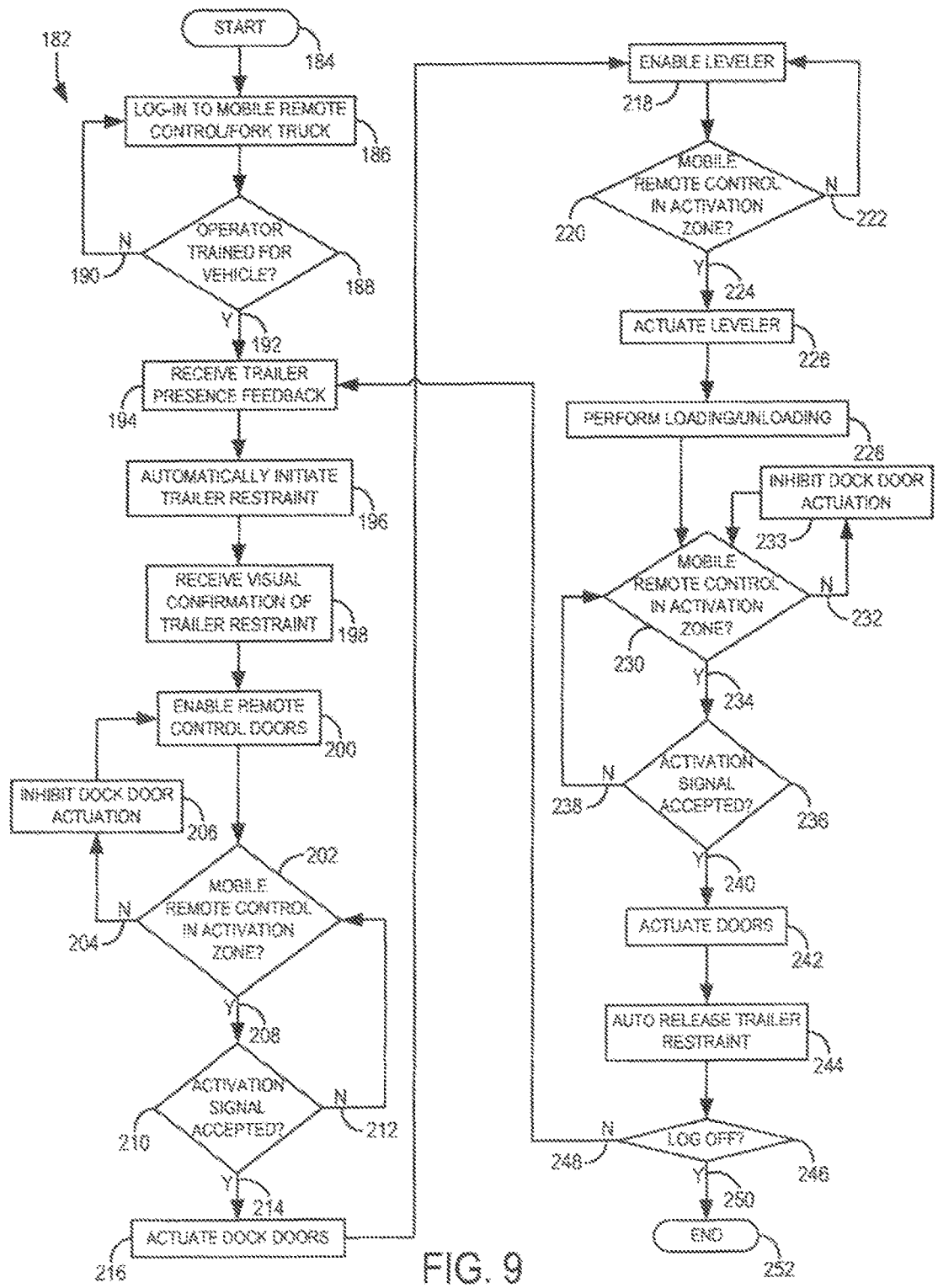
FIG. 9 is a flow chart illustrating the detailed steps of operation of the docking station of FIG. 2 with the workflow procedure compliance system of FIG. 7.
Figure 10:
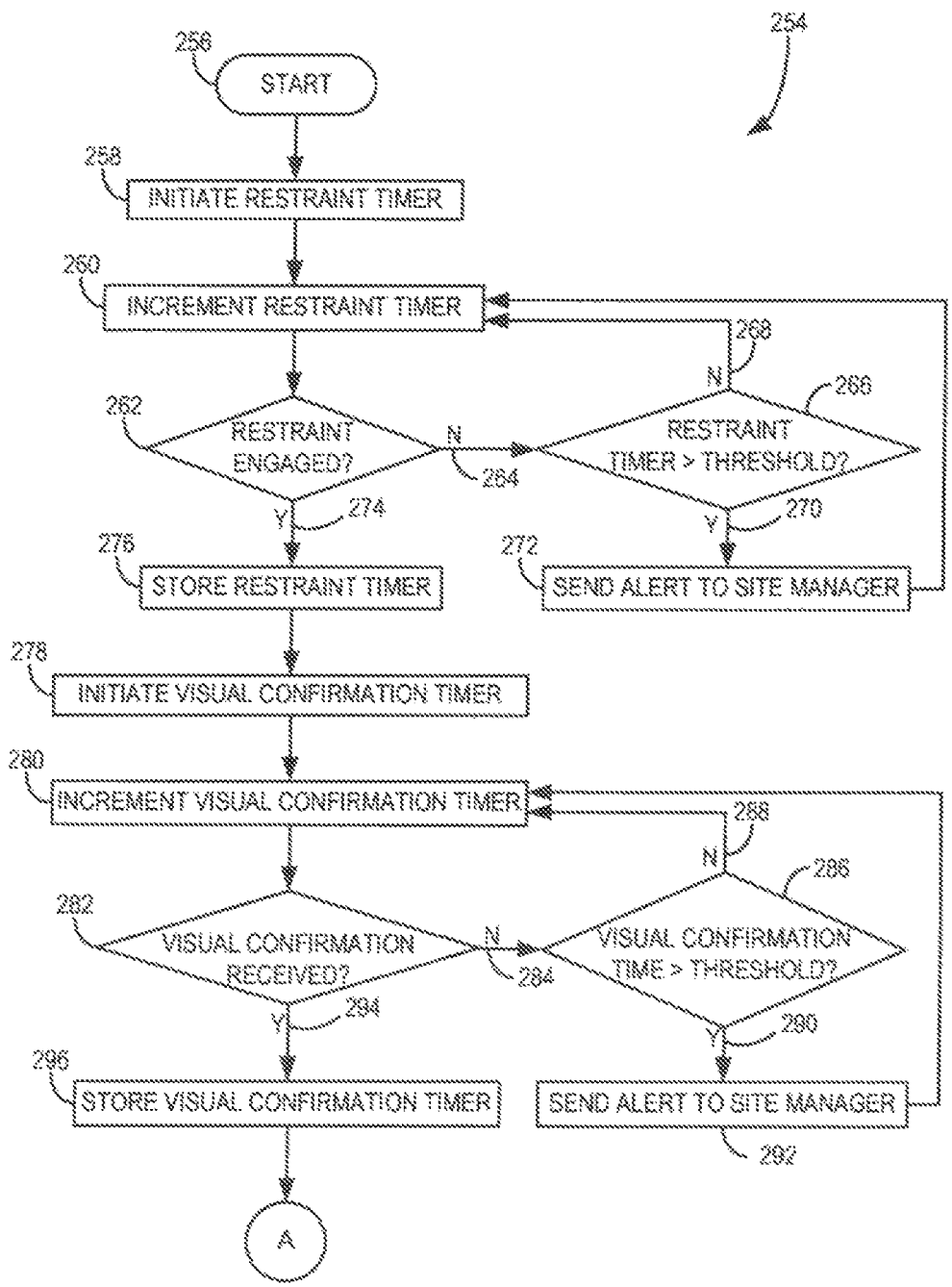
FIG. 10 is a flow chart illustrating the steps for operating an efficiency tracking system to track operation of the docking station of FIG. 2 with the workflow procedure compliance system of FIG. 7.
Figure 11:
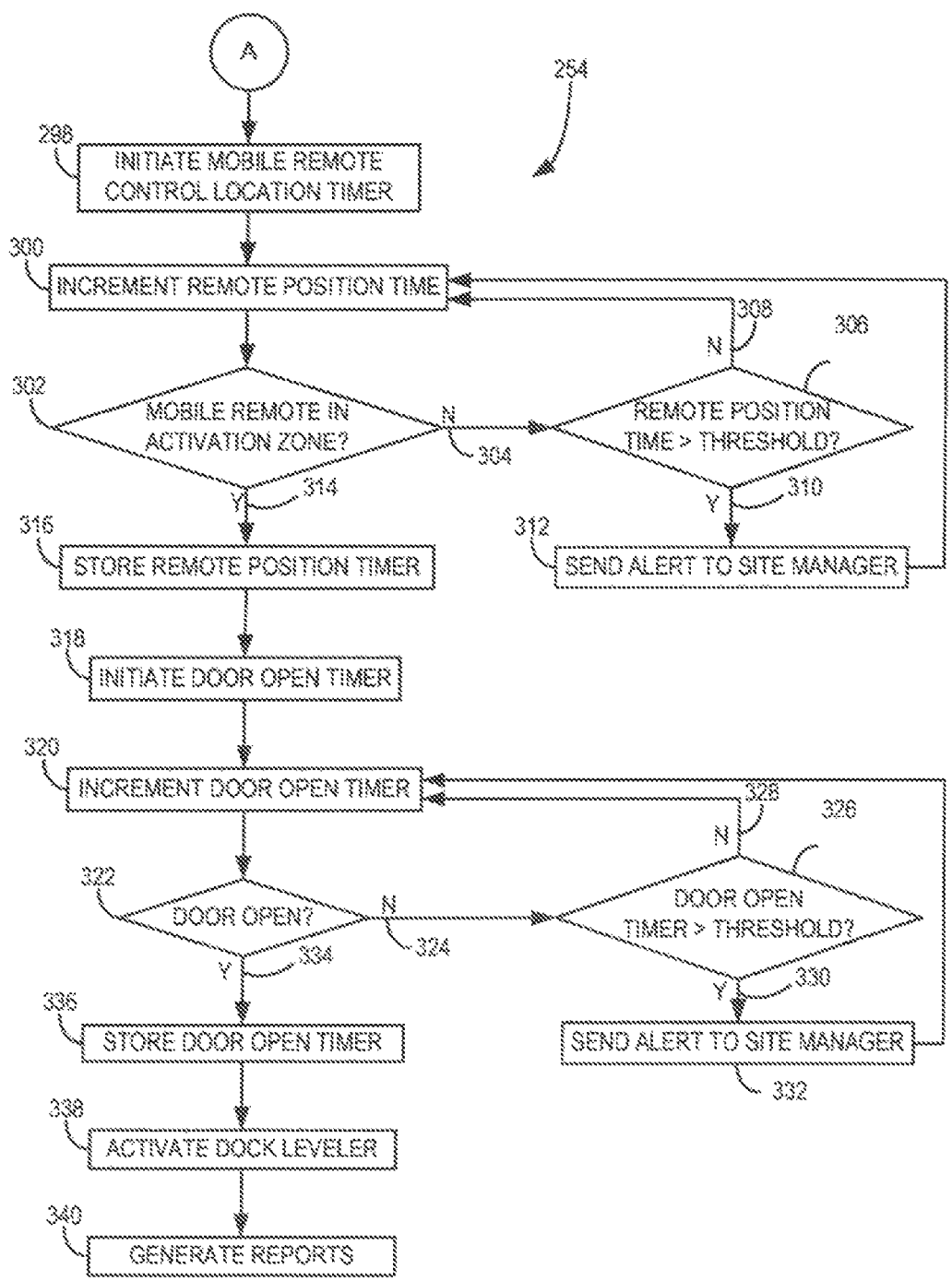
FIG. 11 is a flow chart continuing from FIG. 10 and illustrating the steps for operating an efficiency tracking system to track operation of the docking station of FIG. 2 with the workflow procedure compliance system of FIG. 7.

Referring to FIGS. 9-11, flow charts illustrating techniques for receiving feedback from a plurality of docking station components are shown. The techniques illustrate the steps for processing the feedback received from the components to determine an operational state of each component. As will be described, by determining the operational state of each component, changes in the operational state of a given component can be controlled to mandate an approved operational workflow. Furthermore, by tracking changes in the operational states of the plurality of components, the operational efficiency of the operational workflow can be tracked.

Referring now to FIG. 9, the steps of a technique 182 for user operation of docking stations in accordance with approved workflow protocol is shown in detail. The technique starts 184 by the operator logging-in to a mobile remote control or fork truck 186, as described with respect to FIGS. 4-6. Utilizing the unique login, a check is made to determine whether the operator attempting to use the mobile remote control or fork truck has been properly trained or certified for the equipment and/or for approved workflow protocol 188. Should the user not be properly trained or certified 190, the login is denied and the system returns to prompt a login 186. However, if the login is accepted as indicating proper user training or certification 192, the technique continues by awaiting trailer arrival at a given docking station.

When a trailer arrives at a docking station the system receives feedback indicative of a change in operational state from the sensors disposed to detect trailer presence at the docking station 194. Specifically, the sensors communicate feedback 194 indicating a change in operational state from an absence of a trailer to a presence of a trailer. Responsive to trailer presence feedback 194, trailer restraints are initiated 196 to secure the trailer against unauthorized trailer removal from the docking station. As such, the trailer restraints change operational states from disengaged to engaged 196. As previously described with respect to FIGS. 5 and 6, once the trailer restraints are activated 196, FIG. 9, the user is provided with images, still or video, of the trailer restraints for user verification of proper restraint engagement 198. Once the user has verified proper restraint of the trailer 198, the remotely controllable dock doors change operational states to be enabled 200. Specifically, the receiver/actuator connected to the dock door is activated and await an activation signal from the mobile remote control.

As previously described with respect to FIG. 3, the system monitors the position of the mobile remote control with respect to a plurality of predefined activation zones and non-activation zones to determine whether to allow or inhibit remote actuation of the dock door. It is contemplated that restriction of dock door actuation may be achieved according to multiple techniques.

Specifically, referring to FIG. 9, a check is made to determine whether the mobile remote control is located in an activation zone 202. This check 202 may be performed by either the mobile remote control or remotely by the receiver/actuator or a control system. In any case, if the mobile remote control is located outside of a predefined activation zone 204, dock door actuation is restricted 206. It is contemplated that restriction or inhibition of dock door actuation may be accomplished via multiple techniques. Specifically, it is contemplated that the mobile remote control may not generate an activation signal unless located in an activation zone. Furthermore, if an activation signal is generated, the receiver/actuator may refuse to actuate in response to the receipt of an activation signal unless the signal originated from an activation zone, indicating the mobile remote control is located in an activation zone. Additional locking mechanisms may be utilized to secure the dock door against actuation and only release once the mobile remote control is located in an activation zone and an activation signal is received. These techniques may be used individually or in combination to execute inhibition or restriction of the dock door against actuation 206.

Should the mobile remote control be located in an activation zone and an activation signal is received 208, a check is made to determine whether to accept the activation signal 210. Specifically, though the activation signal is properly generated as originating from an activation zone, the system may be configured to only respond to particular, user-specific activation signals at a given dock door. That is, it is contemplated that a given dock door located within a distribution center may be configured to only respond to certain user-specific activation signals, corresponding to the login 186, at particular times. Accordingly, a dock door may only be actuated by a particular user or users at a given time. Therefore, a given dock door is secured against accidental or unauthorized actuation by users or operators other than those designated to control the given dock door. In accordance with one embodiment, it is contemplated that only one user may be authorized for actuation of a given door at a particular time. In this case, a user must logoff of the mobile remote control before another user can be authorized to actuate the dock door. This allows accurate tracking of events. In any case, should the activation signal not be accepted 212, the remote control doors remain enabled but do not actuate 202. Accordingly, the system awaits receipt of a proper activation signal from within an activation zone 202.

However, if an operational state is detected that allows dock door actuation, the activation signal is accepted as generated by an authorized user 214 and the dock door actuates 216. Once the dock door completes the actuation operational state 216, the dock leveler is enabled 218. While it is contemplated that dock leveling may occur upon door actuation 216, in a preferred embodiment, remote actuation of the leveler, as will be described, is required in order to accommodate loading or unloading of an end-loaded trailer. Accordingly, a check is then made to determine whether the mobile remote control is located in an activation zone 220 and if not, the leveler is not allowed to actuate 222. As such, the operator may be free to commence unloading or loading of end-loaded materials or products. Once loading/unloading of end-loaded materials or products is complete or if the trailer is not end-loaded, the operator may return to an activation zone to actuate the leveler. Specifically, once located in an activation zone 224, the leveler is actuated 226 and loading or unloading of the trailer may commence or continue 228.

After the trailer is loaded or unloaded 228, the technique continues by following trailer disengagement/disembarkment protocol. Specifically, a check is made to determine whether the mobile remote control is again located in an activation zone 230. Again, the system may confirm that the mobile remote control now attempting to be utilized is the same mobile remote control that performed the docking/engagement protocol. If the mobile remote control is located outside of a predefined activation zone 232, dock door actuation is inhibited 233 and the dock door does not close. However, should the mobile remote control be located in an activation zone and an activation signal be received 234, a check is made to determine whether to accept the activation signal 236. That is, though the activation signal is properly generated as originating from an activation zone, it is contemplated that the system may be configured to only respond to particular, user-specific activation signals at a given dock door. Should the activation signal not be accepted 238, the remote control doors remain enabled but do not actuate. Accordingly, the system awaits receipt of a proper activation signal from within an activation zone 230.

However, if the activation signal is accepted as generated by an authorized user 240, the dock doors actuate 242 and the trailer restraints are released 244 such that the trailer may disengage or depart the docking station. At this time, operation regarding the trailer previously present at the docking station is complete and the user may decide to logoff 246. If the user remains logged-in 248, the system is ready to accept another trailer 194. However, should the user logoff 250, the technique ends 252 and another user may login to the mobile remote control and operate the docking station.

Referring now to FIG. 10, the steps of a technique 254 for tracking the operational state and operating efficiency of docking station components is shown. The technique starts 256 at the initiation of a given docking station workflow procedure. It should be recognized that the workflow procedure is only illustrated for exemplary purposes but that the system is designed to preclude operation of a subsequent component until a current component has completed operation in accordance with the workflow procedure. Therefore, while FIG. 10 illustrates a particular embodiment of a docking station workflow procedure that is strictly mandated by the system, it is contemplated that the technique may be similarly applied to other specific docking station workflow procedures or that the illustrated docking station workflow procedure may be augmented for a particular application.

The techniques starts 256 upon identifying the presence of a trailer at the docking station and, if applicable, upon completion of an air-ride suspension dump. The system then initiates a restraint timer 258. This restraint timer is designed to monitor the efficiency of trailer restraint procedures. Upon initiation 258, the restraint timer is incremented 260 and a check is made to determine whether feedback has been received from the restraint system or systems indicating that the trailer is properly restrained against disengagement from the docking station 262. If such feedback is not received 264, a determination is made to check whether the restraint timer has surpassed a tolerance threshold 266. Specifically, the threshold is a value selected to be indicative of a permissible delay associated with restraint engagement with the trailer. Therefore, the threshold value is compared to the current value of the restraint timer to determine whether the current delay in receiving feedback indicative of proper trailer restraint is within permissible efficiency constraints 266.

If the restraint timer is not greater than the threshold 268, indicating the current delay in receiving feedback indicative of proper trailer restraint is tolerable, the system proceeds to increment the restraint timer 260 and reiterate the check for feedback 262. However, if the restraint timer is greater than the threshold 270, indicating an inefficient delay in proper trailer restraint, an alert is sent to the docking station manager or other personnel 272 informing of a delay that is indicative of inefficient workflow operation and that may be indicative of an error in the docking station components comprising the trailer restraint system. Following the transmission of the alert 272, the restraint timer is again incremented 260 and the system reiterates the check for feedback indicative of trailer restraint 262.

Once feedback indicative of trailer restraint is received 274, the restraint timer is stored 276 along with date, time, and location as well as any other alert or user information associated with the restraint timer. Substantially simultaneously with saving the restraint timer 276, a visual confirmation timer is initiated 278 and then incremented 280.

A check is made to determine whether feedback has been received from the mobile remote control or autonomous display system indicating confirmation that the trailer is properly restrained against disengagement from the docking station 282. If such feedback is not received 284, a determination is made to check whether the visual confirmation timer has surpassed a tolerance threshold 286. Again, the threshold is a value selected to be indicative of a permissible delay associated with providing a visual verification indication of trailer presence and/or restraint engagement. The threshold value is compared to the current value of the visual verification timer to determine whether the current delay in receiving restraint verification feedback is within permissible efficiency constraints 286.

If the visual verification timer is not greater than the threshold 288, indicating the current delay in receiving restraint verification feedback is tolerable, the system proceeds to increment the visual verification timer 280 and reiterate the check for restraint verification feedback 282. However, if the visual verification timer is greater than the threshold 290, indicating an inefficient delay in receiving restraint verification feedback, an alert is sent to the docking station manager or other personnel 292 informing of a delay that is indicative of inefficient workflow operation and that may be indicative of an error in the docking station components comprising the trailer restraint system or verification display. Following the transmission of the alert 292, the visual verification timer is again incremented 280 and the system reiterates the check for restraint verification feedback 282. This process continues until visual verification feedback is received 294 whereby the visual verification timer, date information, time information, and location information as well as any other docking station or user information is stored 296. The process then continues as will be described with respect to FIG. 11.

Referring now to FIG. 11, the steps of a technique 254 for tracking operating efficiency of docking station continue from FIG. 10. The technique 254 continues with the initiation of a remote position timer 298 configured to track the efficiency of the docking operator in reaching an activation zone for remote door actuation following visual verification of trailer restraint. The remote position timer is incremented 300 and a check for feedback indicating that the mobile remote control is located in an activation zone is performed 302.

If feedback indicating that the mobile remote control is located in an activation zone is not received 304, a determination is made to check whether the mobile remote control position timer has surpassed a tolerance threshold 306. That is, the threshold value is compared to the current value of the mobile remote control position timer to determine whether the current delay in receiving feedback indicating the mobile remote control has entered an activation zone, is within permissible efficiency constraints 306.

If the mobile remote control position timer is not greater than the threshold 308, the system proceeds to increment the mobile remote control position timer 300 and reiterates the check for mobile remote control position feedback 302. However, if the mobile remote control position timer is greater than the threshold 310, indicating an inefficient delay in locating the mobile remote control in an activation zone, an alert is sent to the docking station manager or other personnel 312 informing of a delay that is indicative of inefficient workflow operation and may be indicative of an error in docking station components. Following the transmission of the alert 312, the mobile remote control position timer is again incremented 300 and the system reiterates the check for mobile remote control position feedback 302. This process continues until feedback indicating that the mobile remote control has entered an activation zone is received 314. The mobile remote control position timer, date information, time information, and location information as well as any other docking station or user information is then stored 316 for later retrieval for efficiency reports and alerts.

A door open timer is then initiated 318 and incremented 320. A check to determine whether feedback indicating that the dock door has been actuated is performed 322. If feedback indicating that the dock door has not been actuated is not received 324, a determination is made to check whether the door open timer has surpassed a tolerance threshold 326. Specifically, a threshold value is compared to the current value of the door open timer to determine whether the current delay in receiving feedback indicating the doors have been actuated, is within permissible efficiency constraints 326.

If the door open timer is not greater than the threshold 328, indicating the current delay in opening the dock door is tolerable, the system proceeds to increment the door open timer 320 and reiterates the feedback check 322. However, if the door open timer is greater than the threshold 330, indicating an inefficient delay in opening the dock door, an alert is sent to the docking station manager or other personnel 332 informing of a delay that is indicative of inefficient workflow operation and may be indicative of an error in docking station components. Following the transmission of the alert 332, the mobile remote control position timer is again incremented 320 and the system reiterates the check for door open feedback 322. This process continues until feedback indicating door actuation is received 334. The door open timer, date information, time information, and location information as well as any other docking station or user information is then stored 336 for later retrieval and processing for efficiency reports and alerts.

Following door actuation, the system may be configured to activate and engage a dock leveler 338 to level the docking station to the trailer. It is contemplated that a leveler timer may be utilized, incremented, checked and stored in a manner similar to the above-described timers. However, as such leveling may not be desirable in certain applications, such as end-loaded trailers or when utilizing an extendable conveyer system, it is contemplated that the leveler timer may be bypassed. Additionally, it is contemplated that numerous other timers may be utilized to track the efficiency, such as jack placement and confirmation timers, and provide real-time alerts regarding trailer disembarkment/disengagement workflow protocol and other docking station workflows.

Accordingly, the system is configured to generate a wide range of reports 340 using the information stored during the workflow or other workflows. For example, it is contemplated that the reports may include real-time display of current distribution center, dock, and operator efficiency, periodic efficiency information and composite distribution center, dock, and operator efficiency information. Further, the reports may include a comparison of a particular user's performance and/or efficiency to another user's performance and/or efficiency. Furthermore, the report may include a comparison of a user's current performance and/or efficiency to that user's previous performance and/or efficiency. Some reports may be provided in real-time such as the efficiency spectrum 120 described with respect to FIGS. 5 and 6. In any case, users, operators, and managers are provided with a wide variety of information regarding the efficiency and compliance with workflow protocols.

It is contemplated that the accuracy of reporting may be enhanced and/or supplemented by utilization of the aforementioned interrupt and/or bypass functionality. That is, by allowing an operator to suspend or bypass portions of the workflow process under appropriate conditions, efficiency reports will accurately reflect unavoidable delays due to equipment failures or the like. For example, should an operator identify a damaged product, the operator may be permitted to suspend a given timer by recording the identified error in order to correct the damage without being "penalized" in the report. Furthermore, operators may be able to bypass or "hand-off" certain procedures to allow for breaks or shift changes. Accordingly, such information may be included in the efficiency reports and allow a reviewer to more accurately understand the circumstances affecting the efficiency of a given operator or class of operators or delays inherent in the approved workflow procedure.

Figure 12:
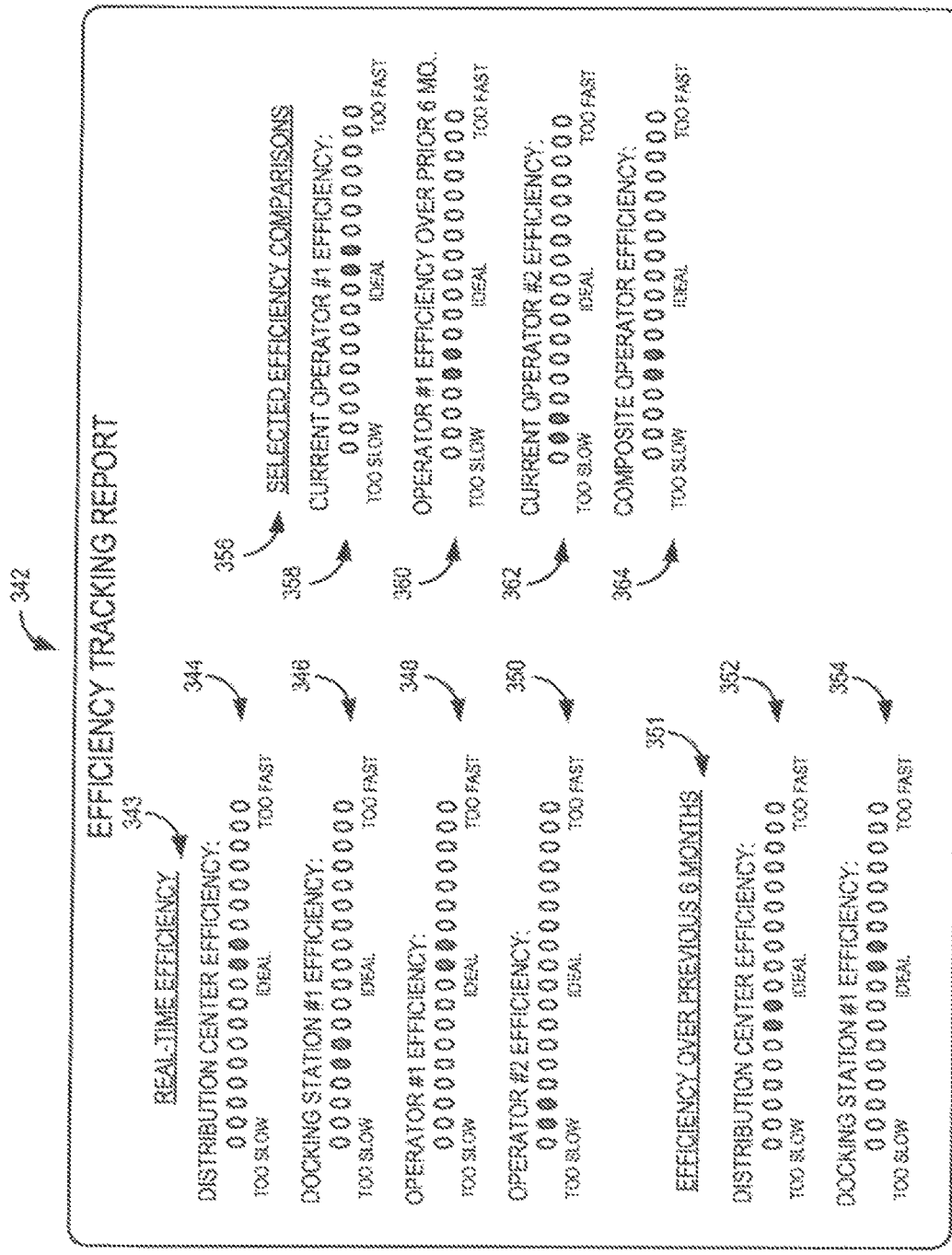
FIG. 12 is an illustration of an efficiency tracking report as generated according to the operation of efficiency tracking system of FIG. 11.

Referring to FIG. 12, an illustration of one embodiment of an efficiency report 342 is shown. It is contemplated that the efficiency report 342 be communicated as a GUI and transmitted across a communications network or be a printed report. The efficiency report 342 includes a variety of information and can be configured to augment the displayed efficiency information to display other configurations or selected distribution centers, docking stations, or operators.

In the illustrated embodiment, the efficiency report 342 utilizes the efficiency spectrum form of display, described with respect to FIGS. 5-6. Accordingly, real-time or current efficiency levels 343 for the selected distribution center 344, docking station 346, and operators 348, 350 are readily identifiable. Additionally, periodic efficiency levels 351 are displayed over a user-designated period, for example, of six months. Specifically, the efficiency of the selected distribution center 352 and docking station 354 over the previous six months is displayed.

Furthermore, selected efficiency comparisons 356 may be generated using a comparison engine (not shown) to aid in comparing more detailed efficiency information. For example, the efficiency tracking report 342 includes a side-by-side comparison of current operator #1 efficiency 358 with operator #1 efficiency over the prior six months 360. Accordingly, a manager can readily discern whether operator efficiency is increasing, decreasing, or ideal. Furthermore, the efficiency tracking report 342 also includes current operator #2 efficiency 362 and composite operator efficiency 364 to facilitate broader evaluations between operators.

The illustrated efficiency report 342 shows only one contemplated embodiment and other reports and notifications are also contemplated. It is contemplated that the efficiency report 342 may be alternatively formatted for specific individuals such as individual operators or management personnel. The illustrated efficiency report includes a variety of information 343-364 that is desirable to management personnel. However, as stated, additional efficiency reports are contemplated. For example, an efficiency report intended for review by an operator may only include information regarding the individual operator and the performance of the operator with respect to previous performance and to composite operator efficiency.

Therefore, a wide variety of information can be compiled and communicated regarding workflow operations and efficiency. This information can be utilized to streamline productions, cure defective procedures, and ensure operational protocol is adhered to strictly.

Therefore, the present invention includes a loading dock remote control system. The system includes a facility having at least one dock station for exchanging materials and a dock component configured to operate in at least two operational states. An actuator is included in the loading dock remote control system that is configured to change the operational state of the dock component in response to an activation signal and a mobile remote control is configured to generate the activation signal to cause the actuator to change the operational state of the dock component. The loading dock remote control system also includes at least one predefined non-activation zone wherein changing operational states of the dock component is inhibited when the mobile remote control is located within the at least one predefined non-activation zone.

In another embodiment of the present invention, a method of remotely controlling loading dock doors includes receiving a trailer at a docking station having a remotely controllable dock component and enabling remote activation of the remotely controllable dock component. The method also includes disabling remote activation of the remotely controllable dock component if an operator is located other than in a pre-designated activation zone.

Another embodiment of the present invention includes a loading dock component remote control system. The system includes a facility having a plurality of trailer positions, each trailer position having a dock thereat and a dock component positioned at each dock and configured to be activated permit and restrict access to and from the distribution center from the dock. The loading dock component remote control system also includes an actuator configured to actuate the dock component and a receiver configured to cause the actuator to actuate the dock component in response to an activation signal. Also, the loading dock component remote control system includes a mobile remote control configured to generate the activation signal and having an operable range about the receiver and at least one predefined non-activation zone within the operable range, wherein actuation of the dock component is disabled if the mobile remote control is located within the at least one non-activation zone.

The present invention has been described in terms of the preferred embodiment, and it is recognized that equivalents, alternatives, and modifications, aside from those expressly stated, are possible and within the scope of the appending claims.

What is claimed is:

1. A distribution center authorization apparatus for use in a distribution center having at least one dock for exchanging materials with a respective trailer comprising:
 a remote control configured to receive an authorization input and generate an associated activation signal, wherein the authorization input is at least one of a mobile equipment authorization and a user identification input;
 at least one dock component located at the dock and configured to actuate in response to the associated activation signal; and
 a central hub separate from the remote control and programmed to monitor and track the progress of the remote control through a workflow protocol.

2. The apparatus of claim 1 wherein the mobile equipment authorization is a forklift.

3. The apparatus of claim 1 wherein the user identification input utilizes at least one of a login, a password, and a pass-card.

4. The apparatus of claim 1 wherein the remote control is inhibited from generating an activation signal when a user identification input identifies a user as not having necessary training.

5. The apparatus of claim 1 wherein the remote control is a mobile remote control.

6. The apparatus of claim 5 wherein the mobile remote control is one of a personal wearable device (PWD), personal digital assistant (PDA), and a laptop computer system.

7. The apparatus of claim 5 wherein the mobile remote control is configured to be mounted on the mobile equipment authorization.

8. The apparatus of claim 5 wherein the mobile remote control is configured to track its present location and determine whether the mobile remote control is located in an activation zone.

9. The apparatus of claim 8 wherein the mobile remote control only generates an activation signal when the mobile remote control determines the mobile remote control is located in the activation zone.

10. The apparatus of claim 1 wherein the dock component is at least one of vehicle restraint, dock door, and dock leveler.

11. A workflow authorization system for use in a distribution center having at least one dock with at least one docking component to exchange materials with a respective trailer, the workflow authorization system comprising: a controller configured to receive an authorization and generate an activation signal;
 a central processing center programmed with a docking operation workflow procedure and configured to monitor and track a position of the controller; and
 an actuator configured to change the operational state of the dock component in response to the controller position and the activation signal.

12. The system of claim 11 wherein the authorization is at least one of an vehicle authorization and a user identification.

13. The system of claim 12 wherein the vehicle authorization is an identification of a specific fork truck.

14. The system of claim 12 wherein the user identification utilizes at least one of a user login, a user password, and a user pass-card.

15. The system of claim 14 wherein a user is authorized to use the controller if the user identification indicates the user is properly trained for given equipment according to the docking operation workflow procedure.

16. The system of claim 11 wherein the dock component is one of a trailer restraint, dock door, and dock leveler.

17. The system of claim 11 wherein the controller is a mobile remote control.

18. The system of claim 17 wherein the mobile remote control is one of a personal data assistant (PDA), a personal wearable device (PWD), and a portable computer.

19. The system of claim 17 wherein the central processing center is configured to determine the position of the mobile remote control relative to an activation zone about the at least one dock.

20. The system of claim 19 wherein the activation signal is inhibited from changing the operational state of the dock component if the mobile remote control is located outside the activation zone.

21. The system of claim 11 wherein the central processing center restricts docking operation workflow procedure until a previous step of the docking operation workflow procedure is completed.

* * * * *